(12) United States Patent
Sato et al.

(10) Patent No.: US 6,665,632 B2
(45) Date of Patent: Dec. 16, 2003

(54) ASSEMBLY TOLERANCE ANALYSIS APPARATUS, ASSEMBLY TOLERANCE ANALYSIS METHOD AND STORAGE MEDIUM

(75) Inventors: Yuichi Sato, Kawasaki (JP); Masayoshi Hashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 111 days.

(21) Appl. No.: 10/056,095

(22) Filed: Jan. 28, 2002

(65) Prior Publication Data

US 2002/0198680 A1 Dec. 26, 2002

(30) Foreign Application Priority Data

Jun. 22, 2001 (JP) ........................................ 2001-189511

(51) Int. Cl.$^7$ ............................................... G06F 17/18
(52) U.S. Cl. ...................... 702/179; 700/159; 700/179; 703/1; 703/17
(58) Field of Search ................................ 702/127, 179, 702/194, 195, 196, 199; 703/1, 7, 17; 700/159, 176, 182, 193, 109

(56) References Cited

U.S. PATENT DOCUMENTS

| | | | |
|---|---|---|---|
| 5,301,118 A | * | 4/1994 | Heck et al. ................. 700/109 |
| 5,691,909 A | | 11/1997 | Frey et al. ................... 700/159 |
| 5,949,693 A | | 9/1999 | Tandler ........................... 703/1 |

OTHER PUBLICATIONS

Craig et al., "Systems and methods for simulation, analysis and design of automated assembly systems", PubNo: US 2002/0128810 A1, PubDate: Sep. 12, 2002, FiledDate: Dec. 18, 2001, Provisional application No. 60/258,544, filed on Dec. 29, 2000.*

* cited by examiner

Primary Examiner—John Barlow
Assistant Examiner—John Le
(74) Attorney, Agent, or Firm—Staas & Halsey LLP

(57) ABSTRACT

First, the assembly population of the probability distribution of the mounting state of each part (within the initial setting range of assembly tolerance) is generated using the Monte-Carlo method. Then, an individual group that meets the design specification designated by a user is detected and the initial setting of the assembly tolerance is modified using the individual group. In this case, sensitivity indicating the modification of the assembly tolerance of which part is the most efficient can also be calculated/presented. Furthermore, how much the modification amount should be can also be calculated/presented.

20 Claims, 22 Drawing Sheets

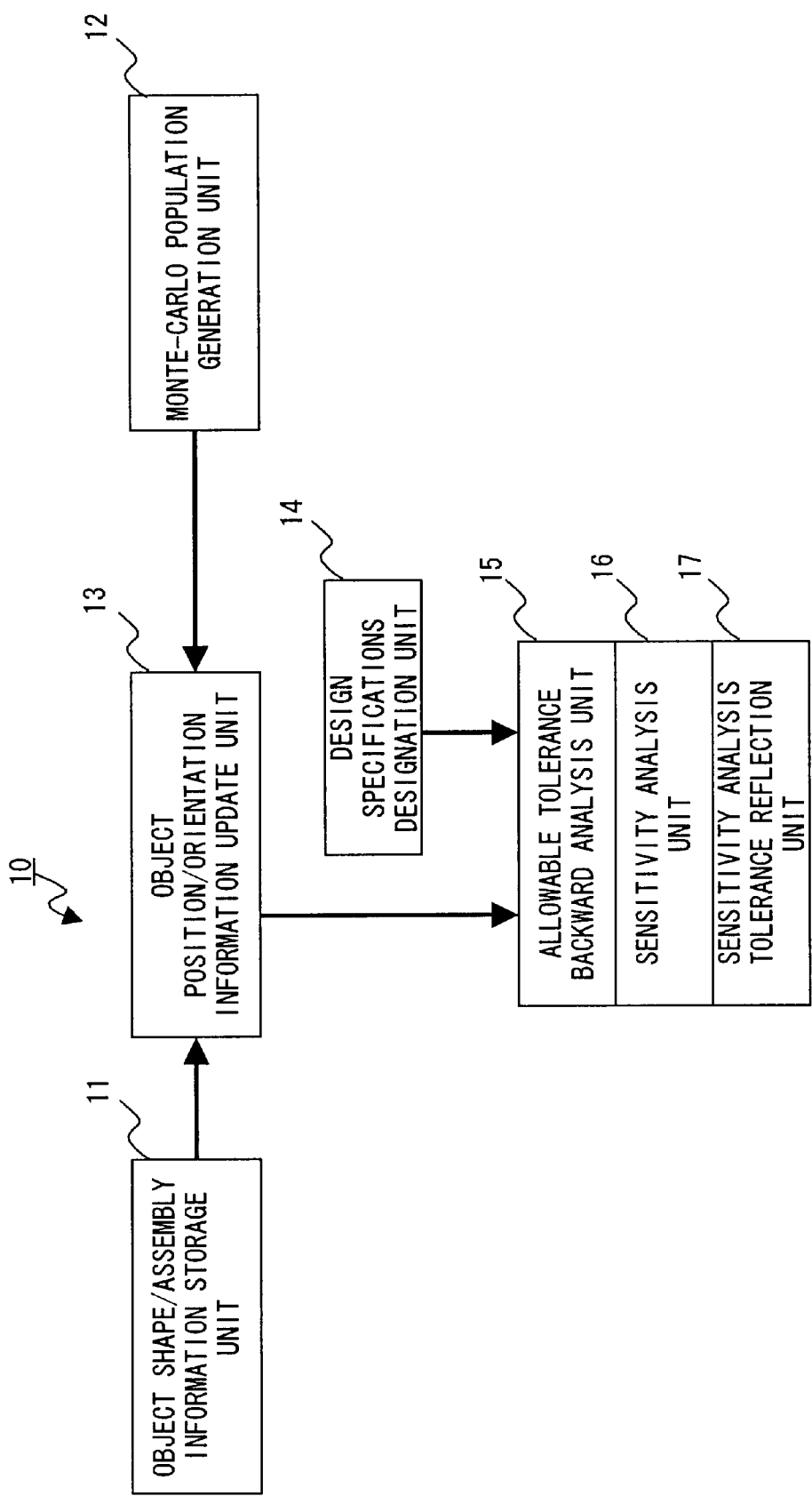
F I G. 1

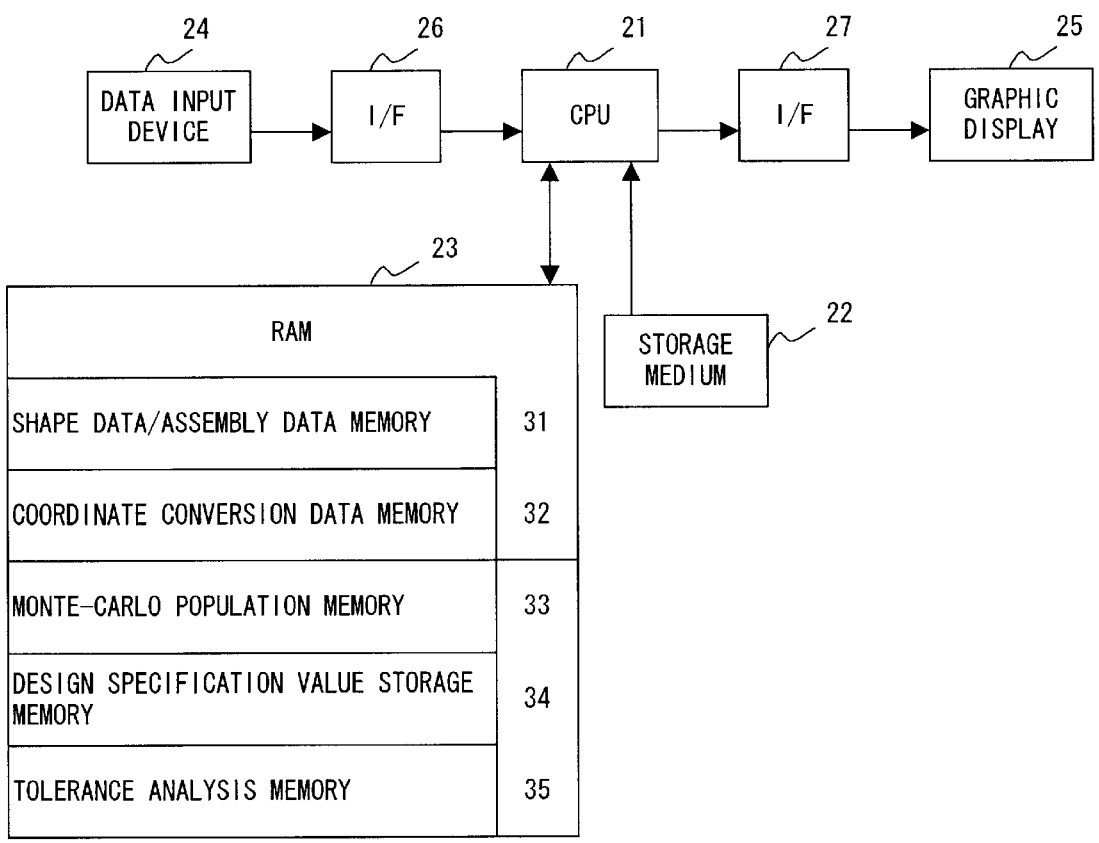
F I G. 2

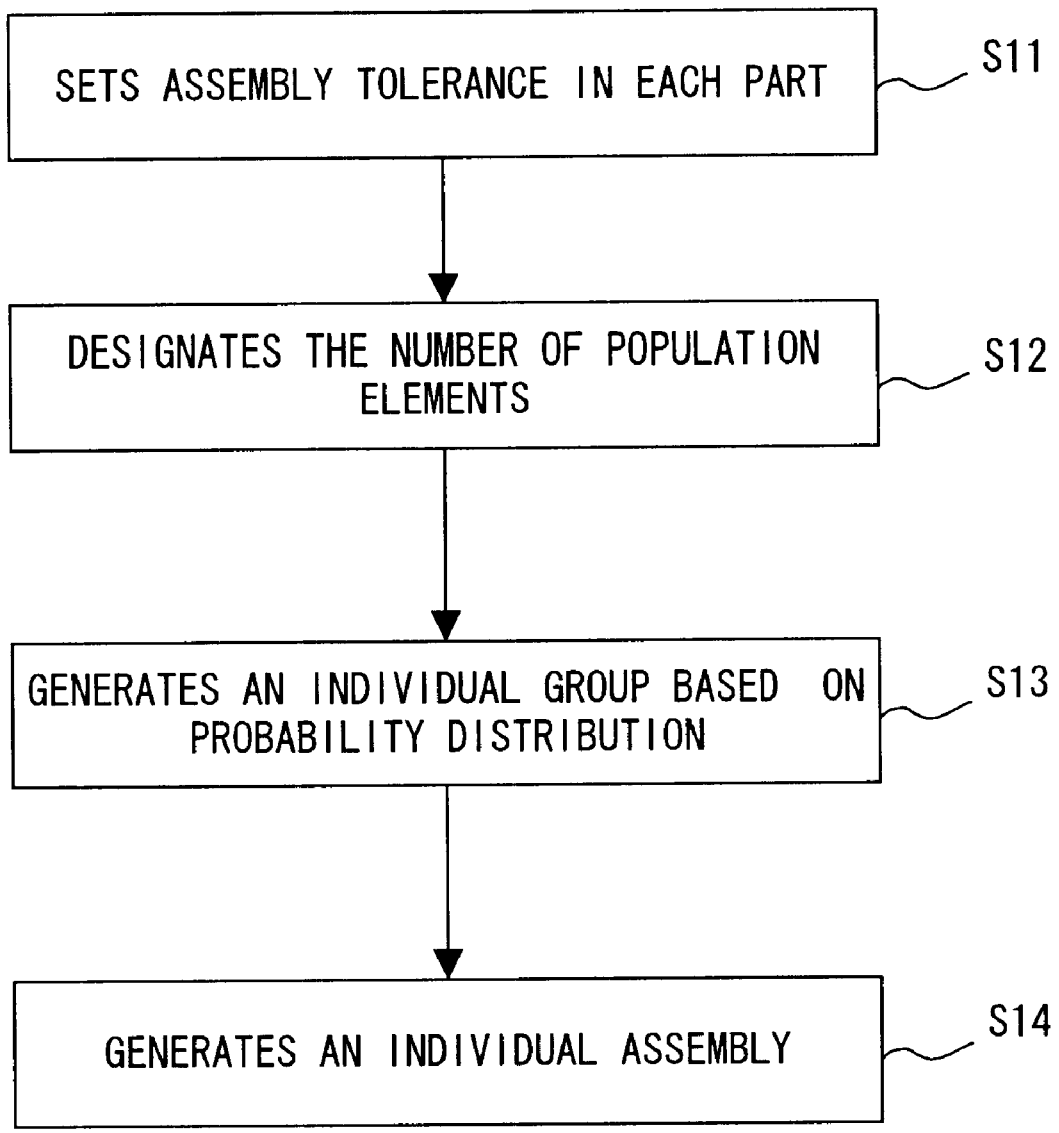
F I G. 5

TOUCHED

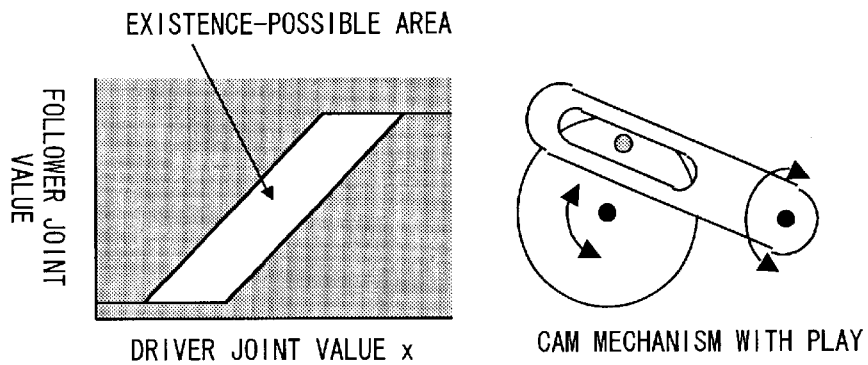
F I G. 8 A
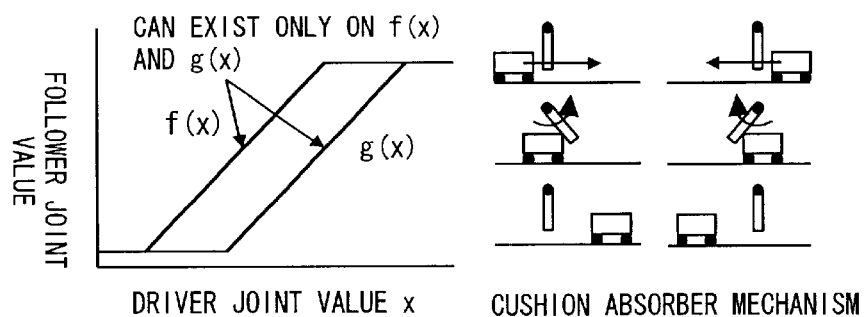
F I G. 8 B
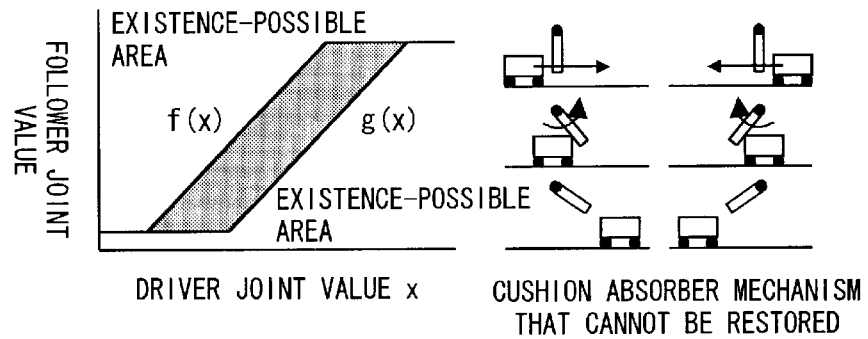
F I G. 8 C

GEARS B AND C ROTATE IN CONJUNCTION WITH GEAR A, AND PART D ROTATES THE CALCULATED GROOVE RELATIONSHIP

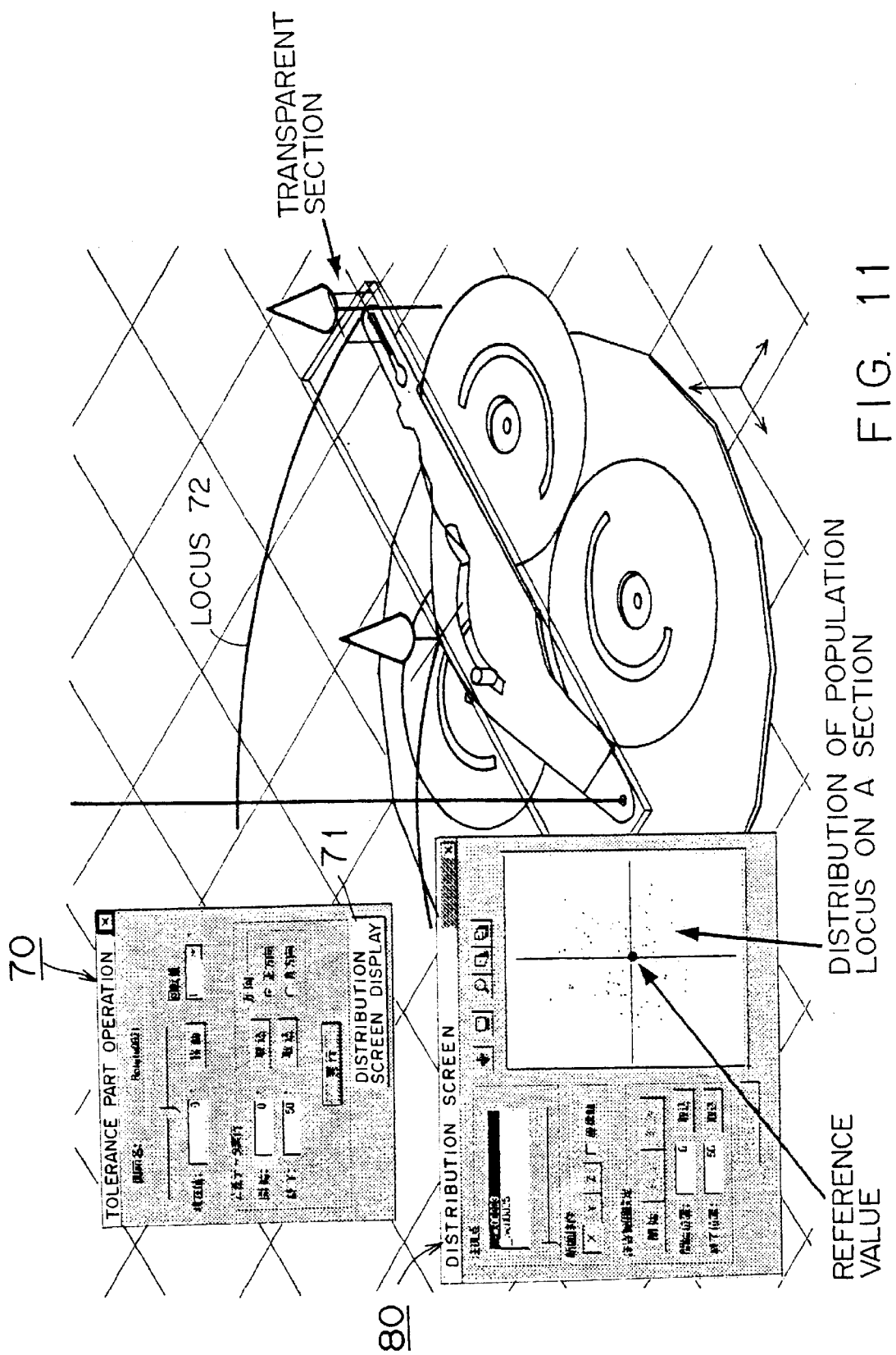

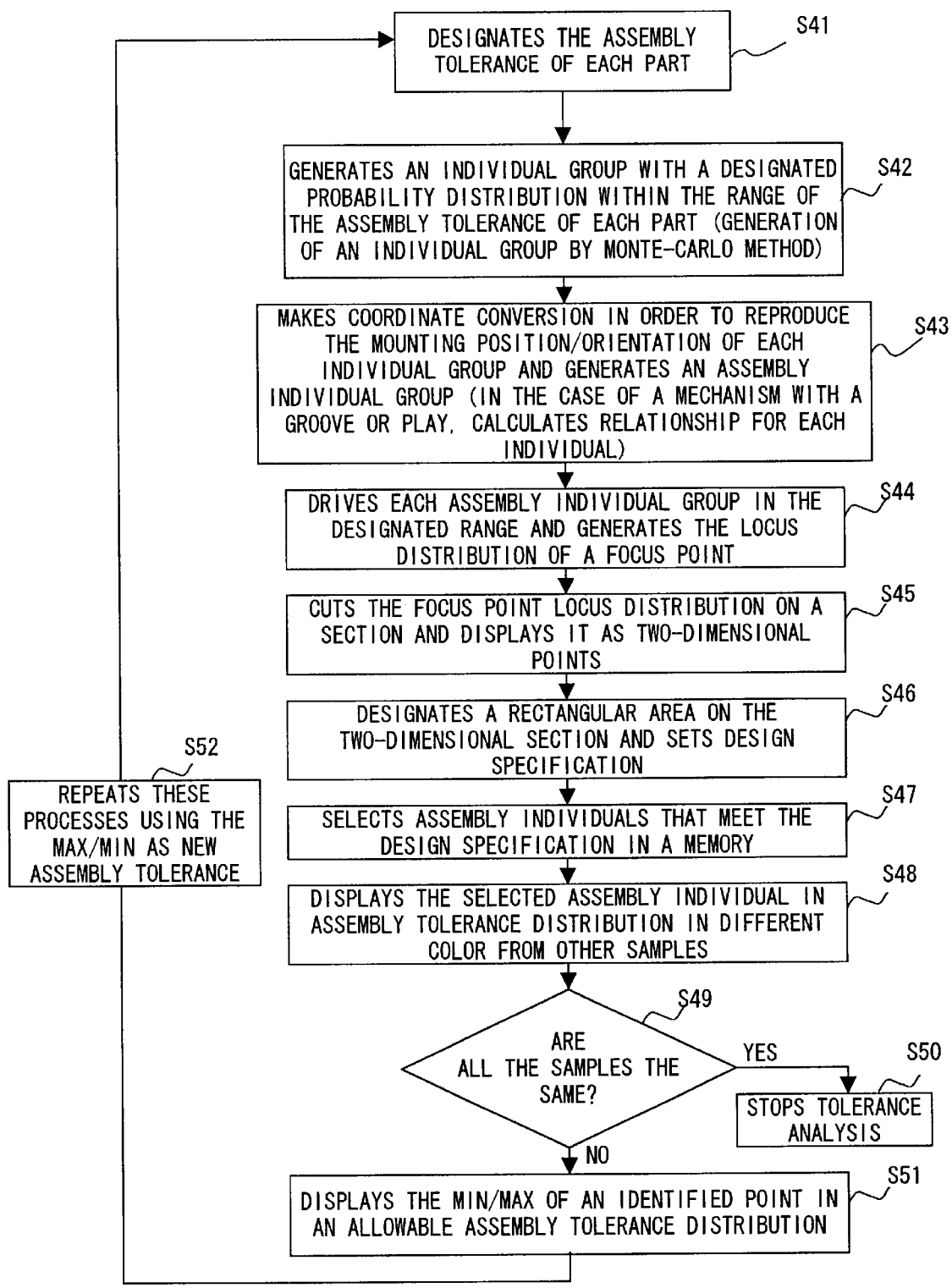
F I G. 1 4

S81: AS FOR THE ASSEMBLY TOLERANCE OF EACH PART, CALCULATES (THE CHANGE AMOUNT IN THE NUMBER OF ASSEMBLY INDIVIDUALS THAT DO NOT MEET THE DESIGN SPECIFICATION OBTAINED WHEN CHANGING THE ASSEMBLY TOLERANCE BY A SPECIFIC AMOUNT)/(THE CHANGE AMOUNT IN THE NUMBER OF ASSEMBLY INDIVIDUALS THAT MEET THE DESIGN SPECIFICATION)=A

S82: DISPLAYS A AS AN ATTRIBUTE VALUE IN THE ASSEMBLY TOLERANCE OF EACH PART

FIG. 17

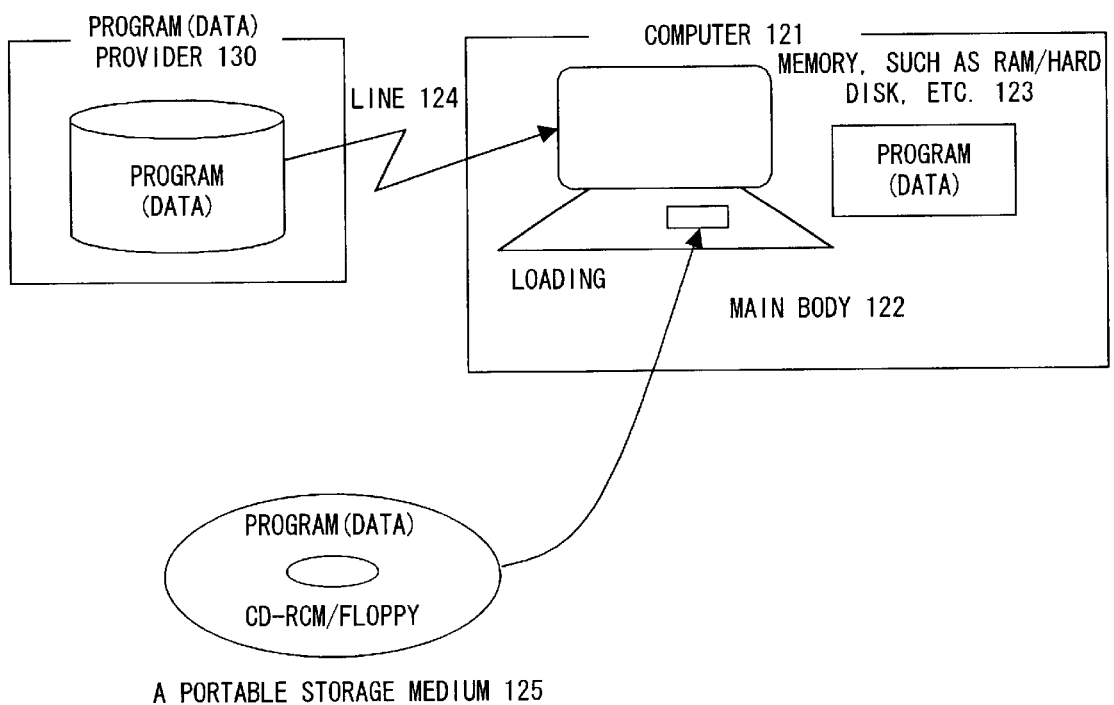
F I G. 2 0

ASSEMBLY TOLERANCE ANALYSIS APPARATUS, ASSEMBLY TOLERANCE ANALYSIS METHOD AND STORAGE MEDIUM

BACKGROUND OF THE INVENTION

1. Field of the Invention

The present invention relates to a system/method for efficiently calculating the optimal assembly tolerance of a three-dimensional mechanism assembly model.

2. Description of the Related Art

As is well known, tolerance defines how much deviation from a design reference value is allowed in the actual production of a product. Too much tolerance leads with high probability to a defective product. Too small a tolerance leads to both a heavy workload and a high cost since it requires high-accuracy production work. Therefore, it is important to set optimal tolerance. However, in many cases, a designer arbitrarily sets tolerance based on his experience and sense of an actual job. Therefore, a system for supporting a designer in efficiently setting optimal tolerance is required.

Conventional tolerance analysis systems are, for example, as follows.

(1) J. Lee and G. E. Johnson, "Optimal Tolerance Allotment Using a Genetic Algorithm and Truncated Monte Carlo Simulation", Computer-Aided Design, Vol. 25, No. 9, pp.601–611 (1993).
(2) Victor J. Skowronski and Joshua U. Turner, "Estimating Gradients for Statistical Tolerance Synthesis", Computer-Aided Design, Vol. 28, No. 12, pp.933–941 (1996).
(3) Victor J. Skowronski and Joshua U. Turner, "Using Monte-Carlo Variance Reduction in Statistical Tolerance Synthesis", Computer-aided Design, Vol. 29, No. 12, pp.63–69 (1997).
(4) "CE/TOL 6σ" manual, published by Rand Technologies Ltd.
(5) "VALISYS" manual, published by TECNOMATIX Ltd.
(6) C. M. Creveling, "Tolerance Design—A Handbook for Developing Optimal Specification", Addison-Wesley (1997).

In the conventional tolerance analyzing system (for example, (4) or (5)), three-dimensional assembly tolerance could not be designated so that the play in a groove or the play of a shifting gear can be faithfully reproduced. Since both of the systems adopts a method for designating a tolerance in a specific position/orientation of a mechanism based on probability distribution, how the total assembly tolerance in the case where the mechanism causes three-dimensional dynamic drive is distributed cannot be analyzed. Although in the papers (1), (2) and (3), a method for calculating tolerance distribution based on the Monte-Carlo method is discussed, both of the methods is limited to two dimensions and is limited to the analysis of one specific static position/orientation.

SUMMARY OF THE INVENTION

It is an object of the present invention to enable the efficient calculation of optimal assembly tolerance so as to meet the design specification value of a three-dimension mechanism assembly model and to provide an assembly tolerance analysis system and method thereof for supporting the judgment work of a user by calculating/presenting both sensitivity and assembly tolerance that will be close to optimal.

An assembly tolerance analysis apparatus according to the present invention analyzes assembly tolerance. The assembly tolerance analysis apparatus comprises an object shape/assembly information storage unit storing shape/assembly information of each part composing an analysis target, a Monte-Carlo population generation unit generating a population of assembly samples with a slightly different mounting position/orientation of each part using Monte-Carlo method based on an initial setting value of an assembly tolerance of each part composing an analysis target, a simulation unit simulating an operation of the analysis target in the part mounting position/orientation for each assembly sample obtained by the Monte-Carlo population generation unit using the shape/assembly information and calculating an operation locus of an arbitrary focus point, and an allowable tolerance range backward analysis unit selecting a locus located within a design specification range imposed on the focus point from a plurality of operation loci and determining a new assembly tolerance based on the mounting position/orientation of each part of an assembly sample corresponding to the selected locus.

According to the assembly tolerance analysis apparatus described above, since an assembly sample, in which the operation locus of a focus point is located within the design specification range, is selected from many assembly samples generated by the Monte-Carlo method, optimal assembly tolerance can be determined with high probability by using the mounting position/orientation data of each part obtained when this selected assembly sample is designated (for example, the minimum value or the maximum value of the data as the assembly tolerance).

The new assembly tolerance determined by the allowable tolerance backward analysis unit does not always guarantee that all the operation loci are located within the design specification range. Therefore, the process must be performed again from the beginning using the new assembly tolerance and it must be confirmed that all the operation loci are located within the design specification range. The process of the Monte-Carlo population unit or simulation unit requires a lot of processing time, particularly, if there are many assembly samples.

Therefore, for example, an assembly sample in which the mounting position/orientation of each part meets the new assembly tolerance can also be selected from the assembly samples, and it can also be judged whether all the operation loci corresponding to the selected assembly samples are located within the design specification range. Thus, there is no need for a user to wait during the process and, accordingly, the entire efficiency of the process can be improved.

The present invention is not limited to the assembly tolerance analysis apparatus described above, and the invention can also be incorporated into a storage medium that stores a program for enabling a computer to implement the functions of this assembly tolerance analysis apparatus, transmission signal thereof or method thereof.

BRIEF DESCRIPTION OF THE DRAWINGS

FIG. 1 shows the functional configuration of an assembly tolerance analysis system according to one preferred embodiment of the present invention;

FIG. 2 shows the basic hardware configuration of an information processing device for implementing the assembly tolerance analysis apparatus;

FIG. 5 is a flowchart showing the Monte-Carlo population generation process of an assembly state;

FIGS. 8A, 8B and 8C show examples of areas admitting/not admitting existence of driver/follower joint values, a restorable "shock absorber mechanism" and an unrestorable "shock absorber mechanism";

FIG. 11 shows an example of the display of the locus distribution of a focus point that is obtained when each assembly population is driven by simulation;

FIG. 14 is a flowchart showing the process of the first allowable tolerance backward analysis method;

FIG. 17 is a flowchart showing the process of a sensitivity analysis unit;

FIG. 20 shows the loading onto a computer of a program for implementing the present invention.

DESCRIPTION OF THE PREFERRED EMBODIMENT

Figure 3:
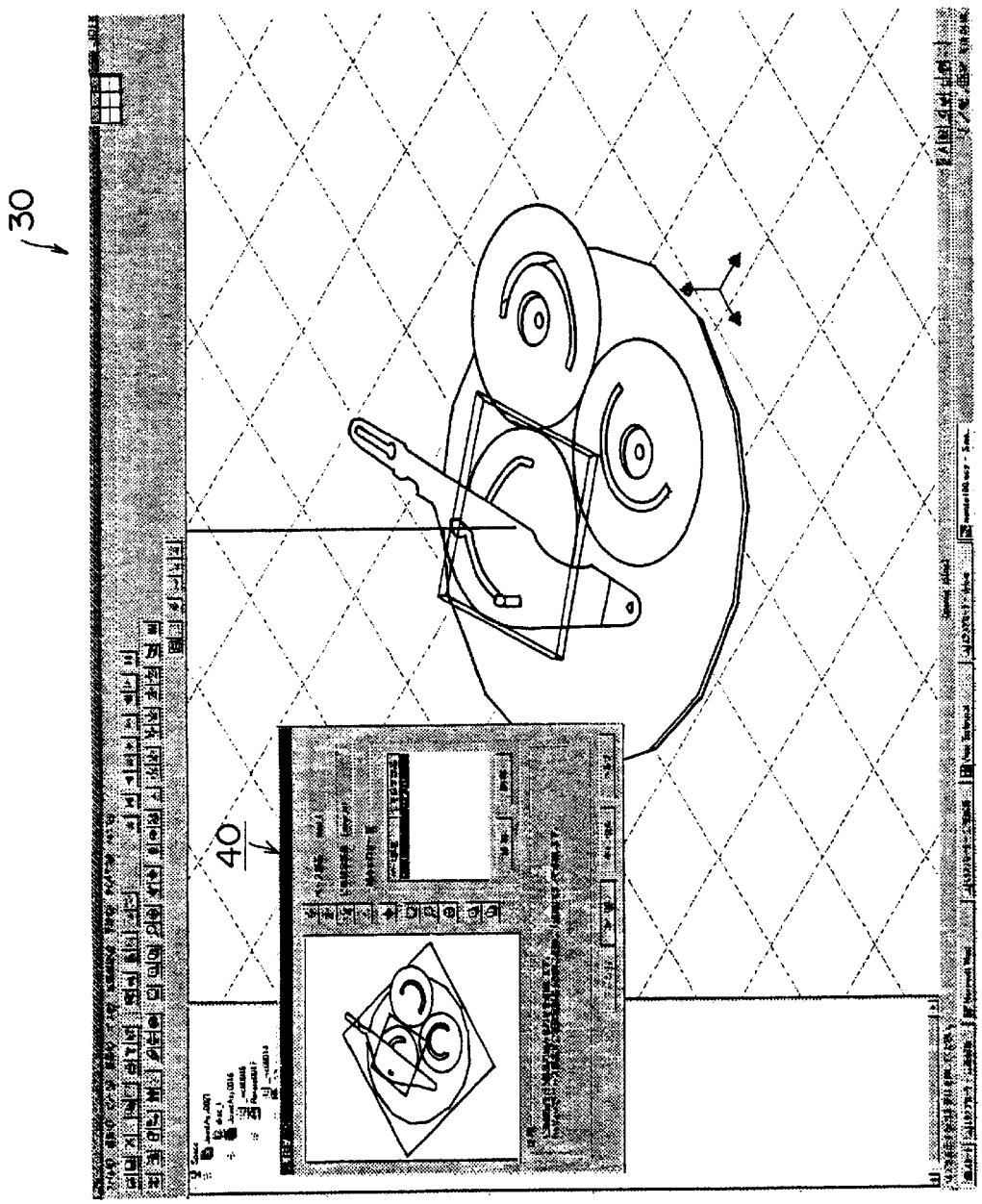
FIG. 3 shows an example of an assembly tolerance setting screen.

The preferred embodiment of the present invention is described below with reference to the drawings.

Tolerance includes dimension tolerance and assembly tolerance. Since this example targets assembly tolerance, "tolerance" that may appear in the following description also means "assembly tolerance".

FIG. 1 shows the functional configuration of an assembly tolerance analysis system according to the preferred embodiment of the present invention.

The assembly tolerance analysis system 10 shown in FIG. 1 comprises an object shape/assembly information storage unit 11, a Monte-Carlo population generation unit 12, an object position/orientation information update unit 13, a design specification designation unit 14, an allowable tolerance backward analysis unit 15, a sensitivity analysis unit 16 and a sensitivity analysis tolerance reflection unit 17.

The object shape/assembly information storage unit 11 stores both the object shape of each part and the assembly state.

The Monte-Carlo population generation unit 12 generates the assembly population of probability distribution based on the Monte-Carlo method of the mounting state of each part.

The object position/orientation information update unit 13 updates the position/orientation state of each individual (assembly element; described later) of the population generated by the Monte-Carlo population generation unit 12.

The design specification designation unit 14 designates the basic specification of an assembly design.

The allowable tolerance backward analysis unit 15 calculates the assembly tolerance of each part so that a focus point, which is described later, meets design specifications using the Monte-Carlo population generation unit 12 and object position/orientation information update unit 13.

The sensitivity analysis unit 16 calculates/presents sensitivity indicating the assembly tolerance of the part that should be modified in order for the focus point to most efficiently meet the design specification (the assembly tolerance of the part that most contributes to the satisfaction of the design specification at this focus point).

The sensitivity analysis tolerance reflection unit 17 calculates/presents a close to optimal value indicating how much the assembly tolerance of each part should be modified in order for the focus point to meet the design specification.

The allowable tolerance backward analysis unit 15 is the most important unit. The allowable tolerance backward analysis unit 15 selects an individual group that meets the design specification (for example, the fact that the distance between some part and some sensor does not exceed a specific value, etc.) designated by a user from the population generated by the Monte-Carlo population generation unit 12. If the design specification is modified, the selected individual group is also modified. However, usability is improved by configuring GUI so that the modification of the design specification and the modification of an individual group can be matched to each other in real time. Furthermore, both the sensitivity analysis unit 16 and sensibility analysis tolerance reflection unit 17 are the major features of the present invention. These units are described in detail later.

FIG. 2 shows the basic hardware configuration of an information processing device for implementing the assembly tolerance analysis apparatus.

In FIG. 2, a CPU 21 performs all logic operations, including the drive/display of shape data/assembly data, the generation of a Monte-Carlo population, the setting of a design specification by a user, the calculation of the allowable tolerance of each part, an operation for displaying a calculation result, an operation for graphically displaying the movement of an object.

A storage device 22 stores a working environment, the shape data/assembly data of an object and their initial positions, the execution module of an algorithm for implementing a variety of processing functions of the assembly tolerance analysis system, an execution module for graphically displaying the movement of an object and other data/execution modules needed to drive the apparatus of the present invention.

A RAM 23 has a variety of storage areas, including a memory area 31 for storing both the working environment and the object shape data/assembly data of an object that are read from the storage device 22 by the CPU 21, a memory area 32 for storing object shape coordinate conversion data calculated by the CPU 21 using object movement designation data inputted through a data input device 24, a memory area 33 for storing a population generated by changing the position/orientation of each part to a variety of values within an allowable tolerance range using the Monte-Carlo method, a memory area 34 for storing a design specification value designated by a user and a memory area 35 for calculating the assembly tolerance (allowable range of amount of departure from the design specification value) of each part using the design specification value and storing the result.

The data input device 24 transmits the tolerance setting value/design specification value of each part and a variety of conditions for making tolerance analysis, to the CPU 21 through an interface (I/F) 26. A graphic display 25 displays the graphic display of assembly data in the RAM 23 that is received through an interface (I/F) 27 and displays the tolerance analysis result.

First, a method for designating three-dimensional assembly tolerance and generating an individual group population by the Monte-Carlo method is described below.

Figure 4A:
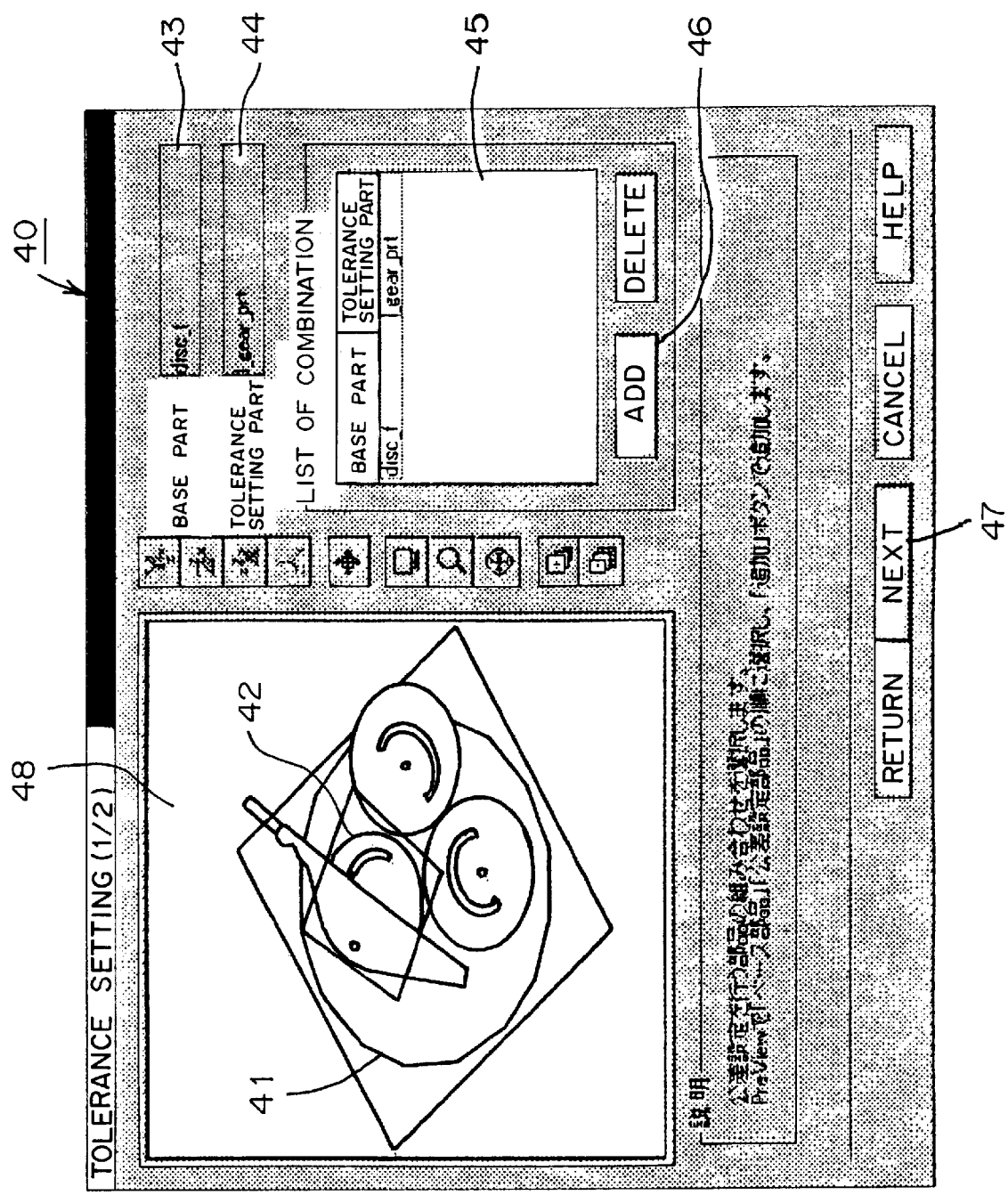
FIG. 4A shows an assembly tolerance setting box and FIG. 4B shows an example of a subsequently displayed setting screen.
Figure 4B:
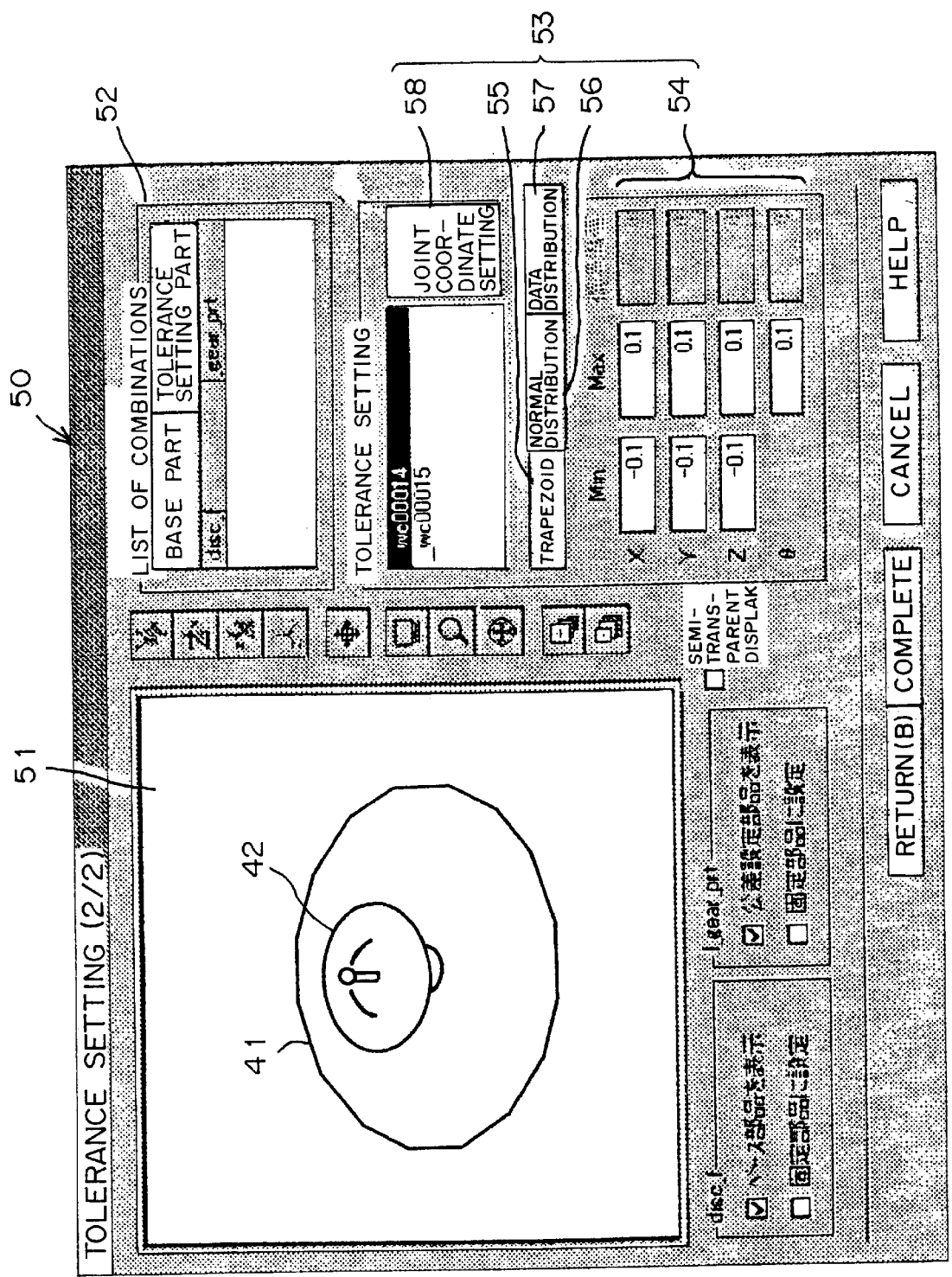

FIG. 3 shows an example of an assembly tolerance setting screen 30. FIG. 4A shows an enlarged assembly tolerance setting box 40 displayed by overlapping the box 40 on the assembly tolerance setting screen 30 shown in FIG. 3. FIG. 4B shows a setting screen 50 that is subsequently displayed after input work in the assembly tolerance setting box 40 is completed.

FIG. 5 is a flowchart showing an assembly state population generation process by the Monte-Carlo method.

In FIG. 5, first, a user or the like designates an assembly (combination of parts) that the user wants to analyze, using an assembly tolerance analysis system according to the preferred embodiment, a setting screen for setting the assembly tolerance of each of the designated parts is displayed and the user or the like makes a variety of settings (step S11).

Specifically, first, the assembly tolerance setting box 40 shown in FIG. 4A is displayed and the user or the like selects/designates the assembly (combination of parts; in this example, a base part and a mounted part).

In FIG. 4A, the user or the like designates a large disc 41 (part description: disc_f) as a base part 43 by clicking a desired part in a selection/designation area 48 and then designates a gear part with a groove 42 (part description: 1_gear_prt) as a part (tolerance setting part 44) to be mounted on this base part. If the user selects/designates the part and clicks an "Add" button 46, this designation content is registered. The content is also displayed in a list of combinations 45. If there is another combination, it is acceptable if the user designates a desired part in the selection/designation area 48 again by clicking the part or the like (the part description of the designated part is displayed in the column of the base part 43 or tolerance setting part 44) and clicks the "Add" button 46. If the user clicks a "Next" button 47 after the selection/input is completed, the assembly tolerance setting box 50 shown in FIG. 4B is displayed.

In the part display area 51 of the assembly tolerance setting box 50 shown in FIG. 4B, the parts designated in FIG. 4A (disc 41 and gear part 42) are displayed and a list of combinations 52 with the same content as that of the list of the combinations 45 is displayed.

A tolerance setting area 53 is also displayed. In this tolerance setting area 53, both the reference coordinate system description of each of the designated parts (in this example, wc00014, wc00015) and an assembly tolerance input area 54 are displayed (each button of other buttons, a "Trapezoid" button 55, a "Normal distribution" button 56, a "Beta distribution" button 57 and a "Joint coordinate modification" button 58, is described later).

As shown in FIG. 4B, in this system, assembly tolerance is set in both coordinate systems, a reference coordinate system (to which the gear part 42 is attached) on the base part side (in this case, on a large disc 41 side) and a reference coordinate system (for mounting a gear part 42) on the side of a part to be mounted on this base part (in this case, the gear part 42).

As this example shows, there are always a part on the side where the part is mounted and a part on the side for mounting the part in an assembly composed of many parts, and each part has both a reference coordinate system on the side where the part is mounted and a reference coordinate system on the side for mounting the part. In this system, deviations from the design reference values of these coordinate systems are defined as assembly tolerance.

According to an assembly tolerance setting method by a user or the like, first, a reference coordinate system in which assembly tolerance is set is selected in the tolerance setting area 53 (in the example shown in FIG. 4B, _wc00014 is selected), and the assembly tolerance of the selected reference coordinate system is inputted to the assembly tolerance input area 54. As shown in FIG. 4B, the assembly tolerance is set in the direction of each of the axes, X, Y and Z. "Min" and "Max" mean the limits (allowable range) of a deviation from the design reference value. θ represents the maximum allowable value of inclination around the Z axis. Specifically, an allowable deviation from the design reference value of each part is within a range specified by these Min/Max limits.

A user can designate the type of probability distribution. Specifically, a user selects a desired button from the probability distribution selection designation buttons shown in FIG. 4B ("Trapezoid" button 55 (rectangular distribution), "Normal distribution" button 56 and "Beta distribution" button 57).

Then, the user or the like designates the number of the elements of a population to be generated (step S12). For example, if the number of population elements is N, N=10000 means the generation of an assembly population composed of 10000 elements. A screen for setting the number of N, which is not shown in FIGS. 3, 4A and 4B, is separately prepared.

In response to the designation operation by the user or the like, on the system side, many samples (elements) are generated at random within the allowable tolerance range according to the designated probability distribution by the Monte-Carlo simulation.

For example, if the assembly tolerance in the X axis direction of part coordinates PartCoord 1 is designated as max=0.1 mm and min=−0.1 mm, in the case of the "Trapezoid" button 55 selected, an individual group in which the respective PartCoord1 positions of individuals are rectangularly distributed in the range of −0.1 to 0.1 away from the reference value in the X axis direction is generated (step S13).

For example, tolerance is designated for the M coordinate systems of "PartCoord 1" to "PartCoord M", the sample PC 11 of "PartCoord 1", the sample PC 22 of "PartCoord 2", . . . , the sample PC MM of "PartCoord M" are combined into one assembly element, and by repeating this process N times, N assembly element in which the position and inclination (orientation) of each part coordinate has a random value within a tolerance range are generated. In the example shown in FIG. 4B, the respective samples of two coordinate systems _wc00014 and _wc00015 are combined into one assembly element. This does not mean that all combinations between each sample of _wc00014 and each sample of _wc00015 are not generated. For example, the first sample generated by wc00014 and the first sample generated by _wc00015 are combined into one assembly element, the second sample generated by _wc00014 and the second sample generated by _wc00015 are combined into another assembly element and so on. However, the first sample generated by _wc00014 and the second sample generated by _wc00015 are not combined into one assembly element.

Then, coordinate conversion is applied to each assembly individual (assembly element) generated in this way, and N assembly individual groups, each with a slightly different mounting state, are generated (step S14).

Next, the Monte-Carlo population generation method used when there is a hysteresis mechanism is described below.

Figure 6:
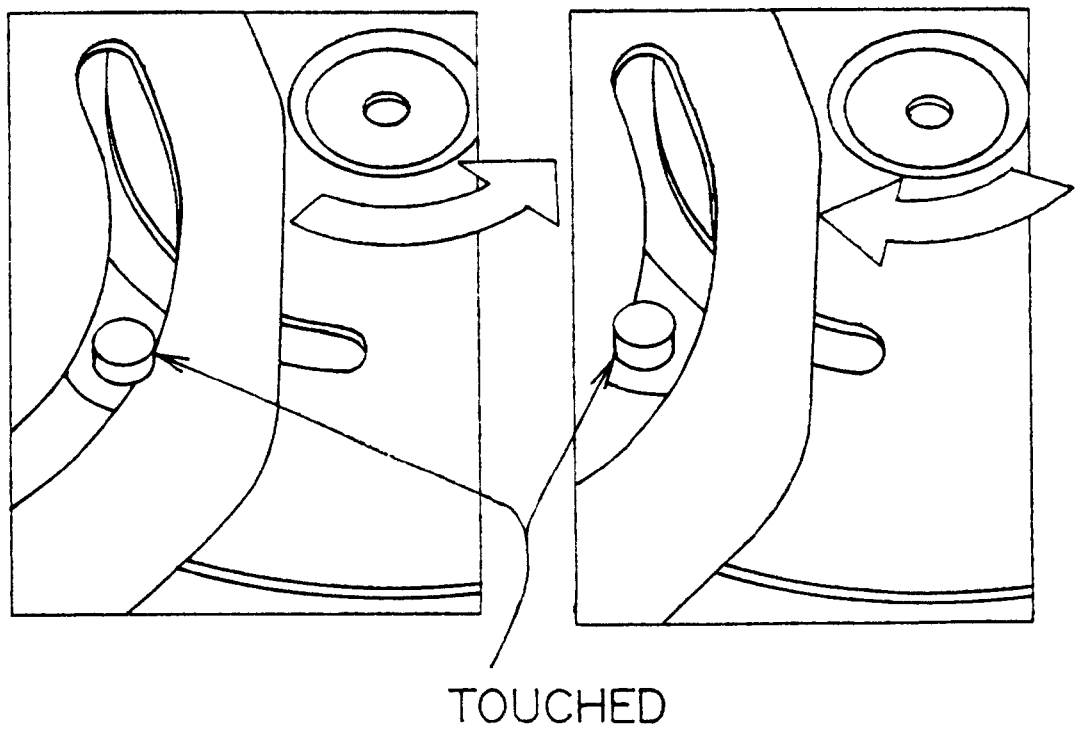
FIG. 6 shows a simple example of a groove joint mechanism (with play)

If an assembly population is generated by the Monte-Carlo method, particularly when there is hysteresis in a groove joint mechanism with play, as shown in FIG. 6, the hysteresis must be faithfully reproduced for each individual of the population. In order to faithfully reproduce the hysteresis, the relationship between the driver joint values and follower joint value of the groove joint mechanism must be calculated for each individual using the cam hysteresis implementation method, which is described below.

Cam Hysteresis Implementation Method
[Premise]

In the case play is not taken into consideration, cam relationship is obtained by generating a function f (x) for calculating a follower joint value y from a driver joint value x (usually using both a table and interpolation). During simulation, calculating the follower joint value y with respect to the joint value x when the driver joint moves, and the follower joint is moved. For each of the joint values x and y, basically the rotation angle of a gear and the like is used.

Figure 7A:
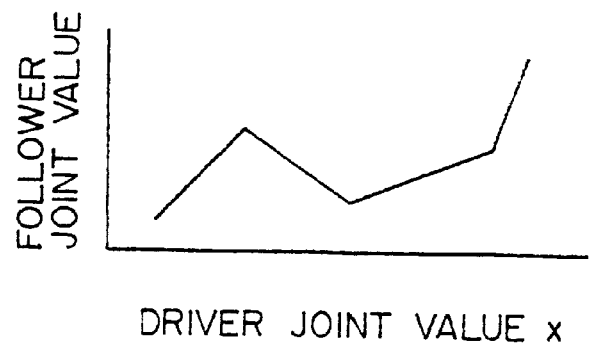
FIGS. 7A, 7B and 7C show examples of a relationship between a driver joint and a follower joint.

If relationship between a driver joint and a follower joint in an arbitrary orientation during simulation is expressed with a graph using a driver joint value (x) and a follower joint value (y) as horizontal and vertical axes, respectively, the graph shown in FIG. 7A is always obtained.

[Implementation Method]

Figure 7B:
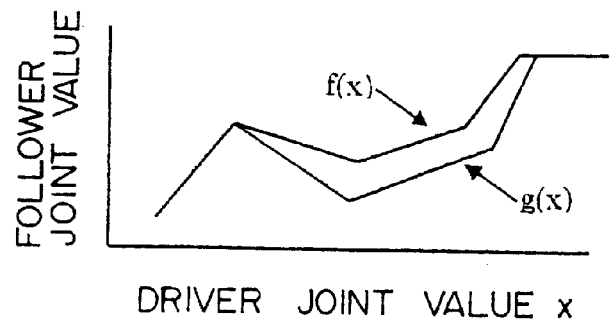
Figure 7C:
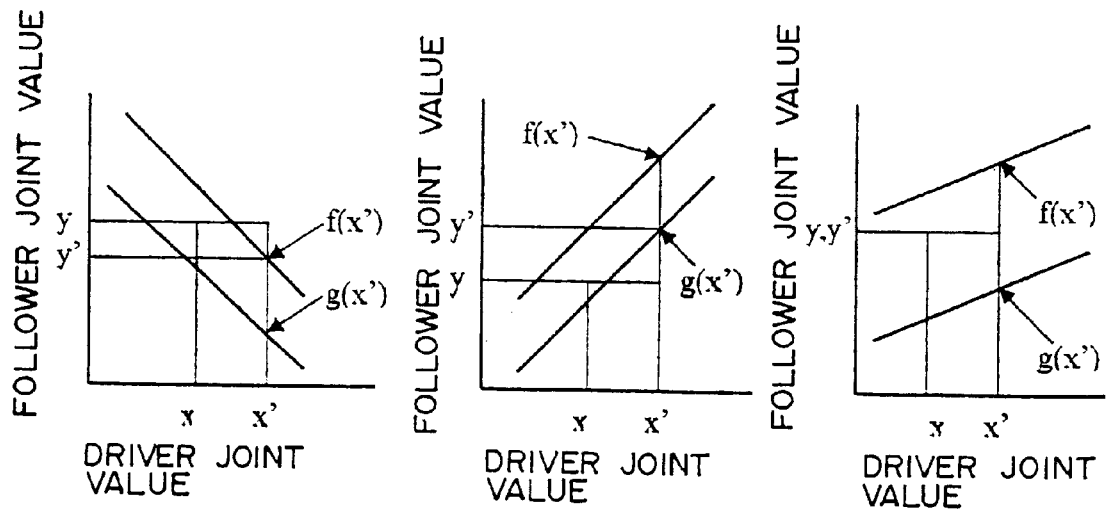

The play of the cam relationship of a groove joint mechanism (which has play, for example, a groove mechanism in which a pin diameter is smaller than groove width), as shown in FIG. 6, can be expressed by doubling the driver/follower relationship. In this case, if the two relationships are expressed by functions f (x) and g (x), the graphs shown in FIG. 7B are obtained.

One of f (x) and g (x) is a graph obtained when x is shifted in the direction of the maximum value and the other is a graph obtained when x is shifted in the direction of the minimum value. In other words, the follower joint value y obtained when the driver joint value x is increased and the follower joint value y obtained when the driver joint value x is reduced are different. However, in this case, it is assumed that f $(x) \geq g$ (x) holds true.

Figure 9:
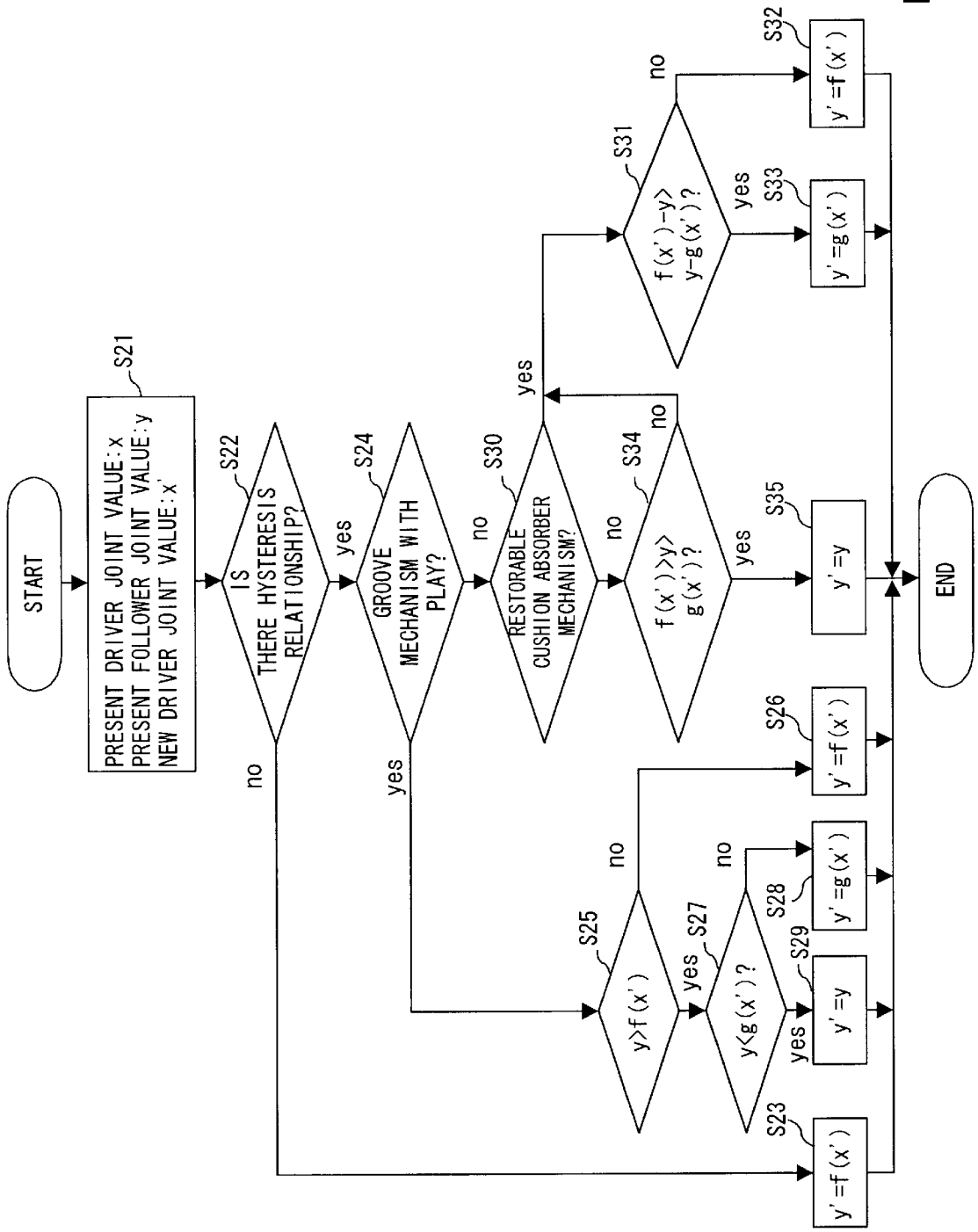
FIG. 9 is a flowchart showing the process for calculating the corresponding follower joint value of a groove mechanism with play or a restorable/unrestorable shock absorber mechanism that is obtained when a driver joint moves.

In a system according to this preferred embodiment, the processes in steps S21 through S29 shown in FIG. 9 are performed. In these processes, if the present driver joint value, the present follower joint value and a new driver joint value obtained when a driver joint moves are x, y and x', respectively, a corresponding follower joint value y' obtained when the driver joint moves to x' is calculated.

First, if there is no play (No in step S22), the f (x) can be assigned without performing any process. Therefore, y'=f (x') (step S23).

If there is play (Yes in step S24), first, both f (x') and g (x') are calculated.

If f (x') is larger than y (No in step S25), y'=f (x') (step S26).

If f (x') is smaller than y (Yes in step S25) and if g (x') is smaller than y (No in step S27), y'=g (x') (step S28).

If a reply in step S27 is Yes, specifically, if y is located between f (x') and g (x'), it is assumed that the follower joint does not change even when the driver joint moves. In this case, y'=y (step S29).

[Application]

In terms of a graph, a method for providing a cam with play means to allow a driver/follower joint value to exist only between f (x) and g (x) (FIG. 8A).

If using this fact generates the following two relationships, the following two cushion absorption mechanisms in the corresponding order, can be expressed (see FIGS. 8B and 8C, respectively).

A. Relationship in which a joint value is allowed to exist only on the line of f (x) or g (x) (it is assumed that if the value is branched, a value, the shift amount from the present y of which is smaller, is designated as a new y)
B. Relationship in which a joint value is allowed to exist except between f (x) and g (x)
A'. "Cushion absorption mechanism" that can be restored by a spring, gravity or the like
B'. "Cushion absorption mechanism" that cannot be restored For this reason, in the system according to this preferred embodiment, and with regard to a "cushion absorption mechanism", the processes in steps S30 through S35 shown in FIG. 9 are performed. Specifically, in the case of a "cushion absorption mechanism" that can be restored by a spring, gravity or the like (Yes in step S30), if the condition of step S31 (f (x')−y>y−g (x')) is met (Yes in step S31), y'=g (x') (step S33). If the condition is not met (No in step S31), y'=f (x') (step S32).

In the case of a "cushion absorption mechanism" that cannot be restored (No in step S30), if the condition of step S34 (f (x')>y>g (x')) is met (Yes in step S34), y'=y (step S35). If the condition is not met (No in step S34), the flow proceeds to step S31.

Although in FIG. 4B, the case where only gears are selected is shown, in the following description it is assumed that a configuration with a groove joint mechanism is targeted and the entire configuration shown in FIG. 4A is selected.

Figure 10A:
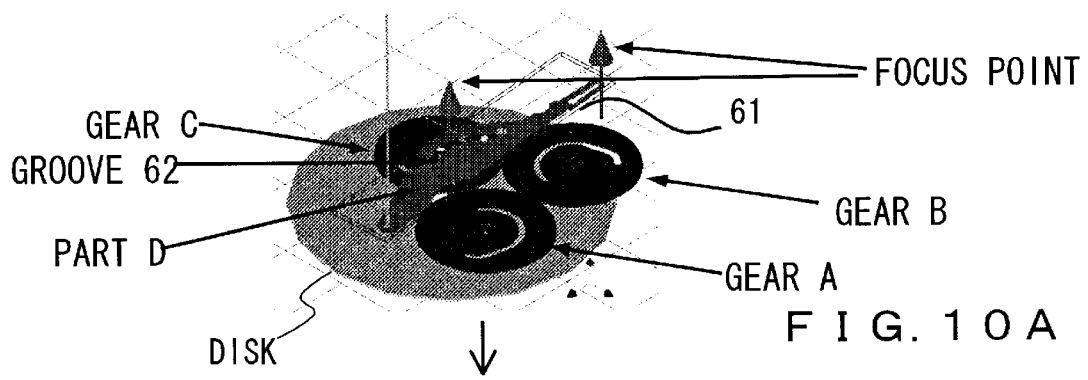
FIGS. 10A, 10B and 10C show the drive by simulation of a configuration, including a groove joint mechanism.
Figure 10B:
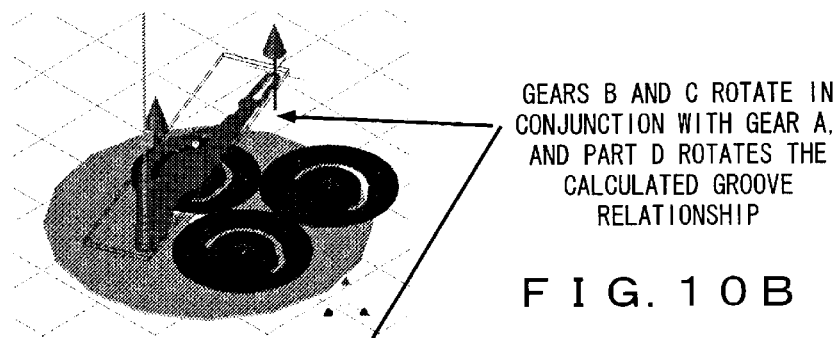
Figure 10C:
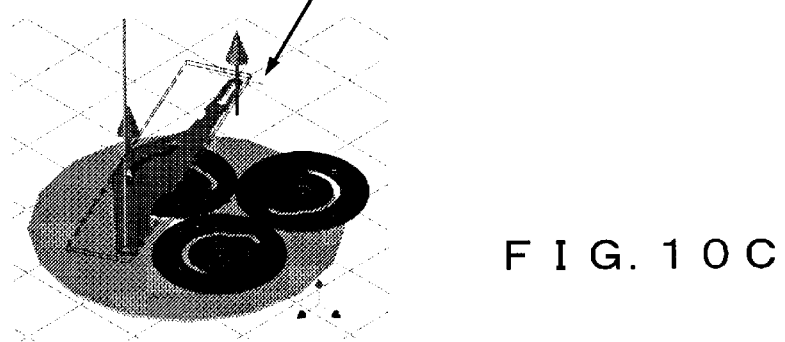

FIGS. 10A through 10C show the drive of the configuration by a three-dimensional CAD simulation function.

In this example, gears B and C rotate using the rotation of gear A as a trigger, and finally part D rotates according to a groove relationship (in FIG. 9, the groove relationship is calculated) between the pin 61 on the gear C and the groove 62 of part D. Although basically a three-dimensional CAD simulation function to simulate this drive operation can be implemented by the already-existing simulation function (which is implemented by the object shape/assembly information storage unit 11, object position/orientation information update unit 13 and the like), the operation of part D in conjunction with both the pin 61 on the gear C and the groove 62 of part D is simulated by calculating a relationship between the driver joint values of the groove joint mechanism by the processes shown in FIG. 9.

In design, for example, it is a major point whether a focus point provided on part D generates a desired locus. For example, if the focus point on part D is designed to move along a another groove (not shown in FIG. 10, etc.), it will be important at least for the focus point to generate a locus without colliding with this groove (For example, the locus must be within the "designation area of the design specification"). However, even if the tolerance of each part (gear) is located within a prescribed range, the operation of the focus point is not always kept within the designation area of the design specification due to so-called "accumulation tolerance".

As described below, by adopting the system according to this preferred embodiment, a user or the like can easily understand the tolerance requirement of each part in order to keep the operation of a focus point within the designation area of the design specification.

First, as shown in FIGS. 10A through 10C simulation is performed for each of the assembly populations described with reference to FIG. 5. For example, if as described above, an assembly population composed of 10000 elements is generated, simulation is performed 10000 times.

FIG. 11 shows an example of the locus distribution of focus points obtained when each individual (element) of the assembly population is driven in this way.

In the example shown in FIG. 11, for example, if a user sets/inputs the rotation amount and the like of a desired part (or designated by the specification) in a tolerance part operation window 70 and performs simulation, the locus 72 of a focus point is generated for the three-dimensional graphics image shown on the right of FIG. 11. In FIG. 11, although the locus 72 looks as if there is a single locus, in reality, 10000 slightly different loci are generated.

Then, if the user clicks a "Distribution screen display" button 71 in the tolerance part operation window 70, the distribution screen window 80 shown in FIG. 11 is displayed. If the user performs a desired setting operation in the window 80, distribution (position distribution of focus points) obtained when the three-dimensional locus is cut and viewed in a desired position (on a transparent cross-section) is displayed. This transparent cross-section can face in an arbitrary (X axis/Y axis/Z axis) direction around the focus point. The user judges in which position/direction the three-dimensional locus should be cut, based on his/her experiences and the like. The user also sets something as a focus point position in advance that attracts a user's attention (part/position considered to be important for equipment to operate normally, such as distance with a sensor, collision with another part and the like).

On the right of the distribution screen window 80 shown in FIG. 11, a state indicating that loci (many "points") are distributed around a reference value are displayed on a cross-section. In this way, the individuals (elements) of an assembly population are statistically distributed around a reference point.

Figure 12:
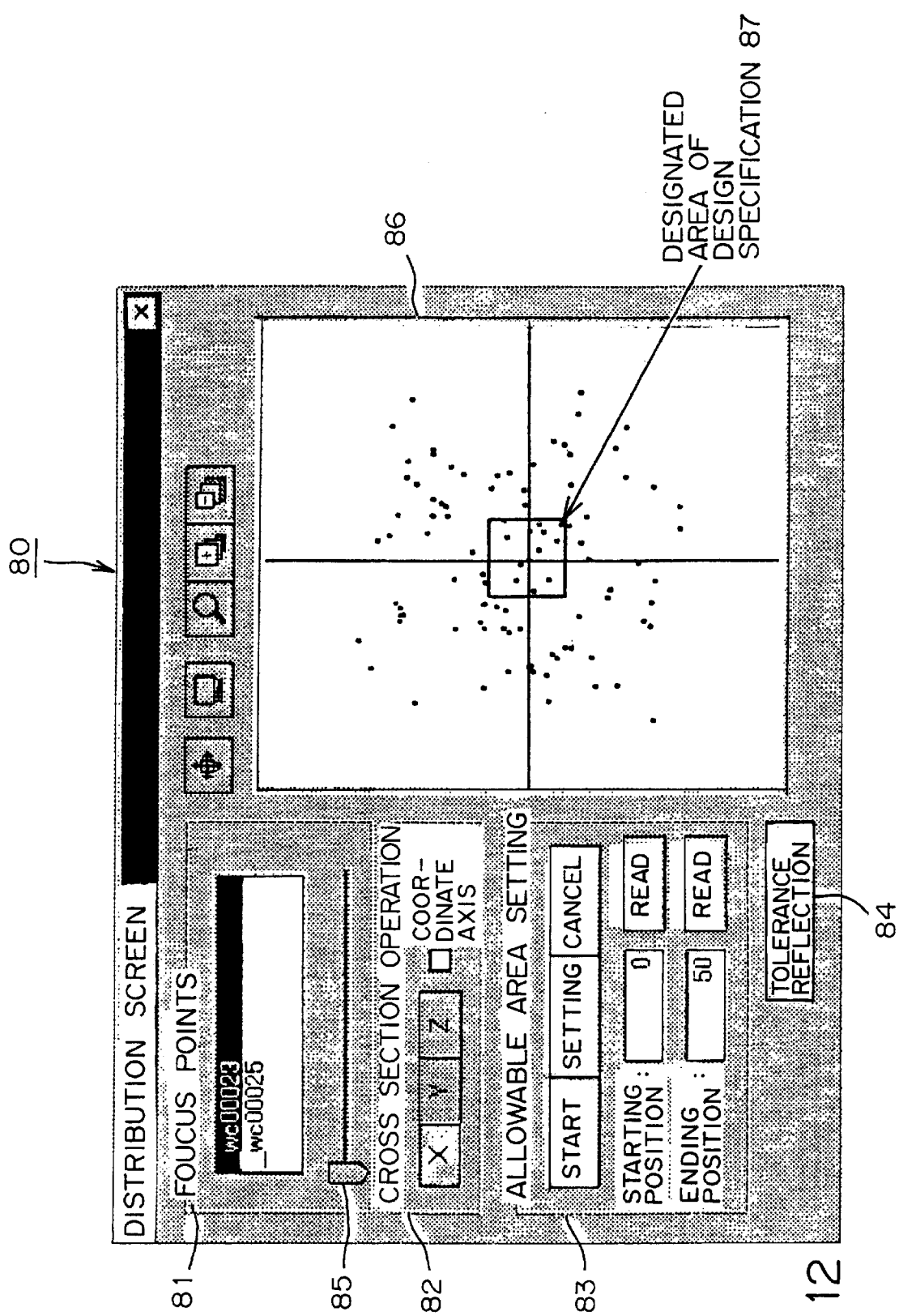
FIG. 12 shows an enlarged distribution screen window.

FIG. 12 shows the enlarged distribution screen window 80.

On the left of the distribution screen window 80, a focus point setting area 81, a cross-section operation area 82 and an allowable range setting area 83 are provided, and the designation ranges of distribution/design specification on a cross-section shown on the right are displayed according to these setting contents.

In the focus point setting area 81, a target focus point is selected (in the example shown in FIG. 12, a focus point that is set/managed in advance using an identification name of _wc00023 is selected) and the cross-section position is designated on the locus of this focus point (set by a slider 85).

In the cross section operation 82, the user determines direction in which the cross-section faces, the X, Y, or Z axis, at the cross-section position. For example, X axis selected.

In the allowable range setting area 83, a range within which the deviation of a focus point on a cross-section in the direction set in the cross-section operation area 82 in the position set in the focus point setting area 81 is allowed (range allowed around a reference point in design) is set.

The range set here is the designation range 87 of design specification shown on the right, and a "point" displayed in this range 87 (rectangle) represents the "individual group of assembly population allowed in design".

This is one example. For example, the range can be graphically designated on the distribution area 80 on the right using a mouse and the like. Alternatively, inputting the numerical values of the vertical axis and horizontal axis, along with their respective minimum/maximum values can designate the range.

The user determines the position in which the three-dimensional locus is cut and also the direction in which the cross-section faces, in the direction of the X, Y or Z axis, based on both his/her experiences and sense.

Figure 13:
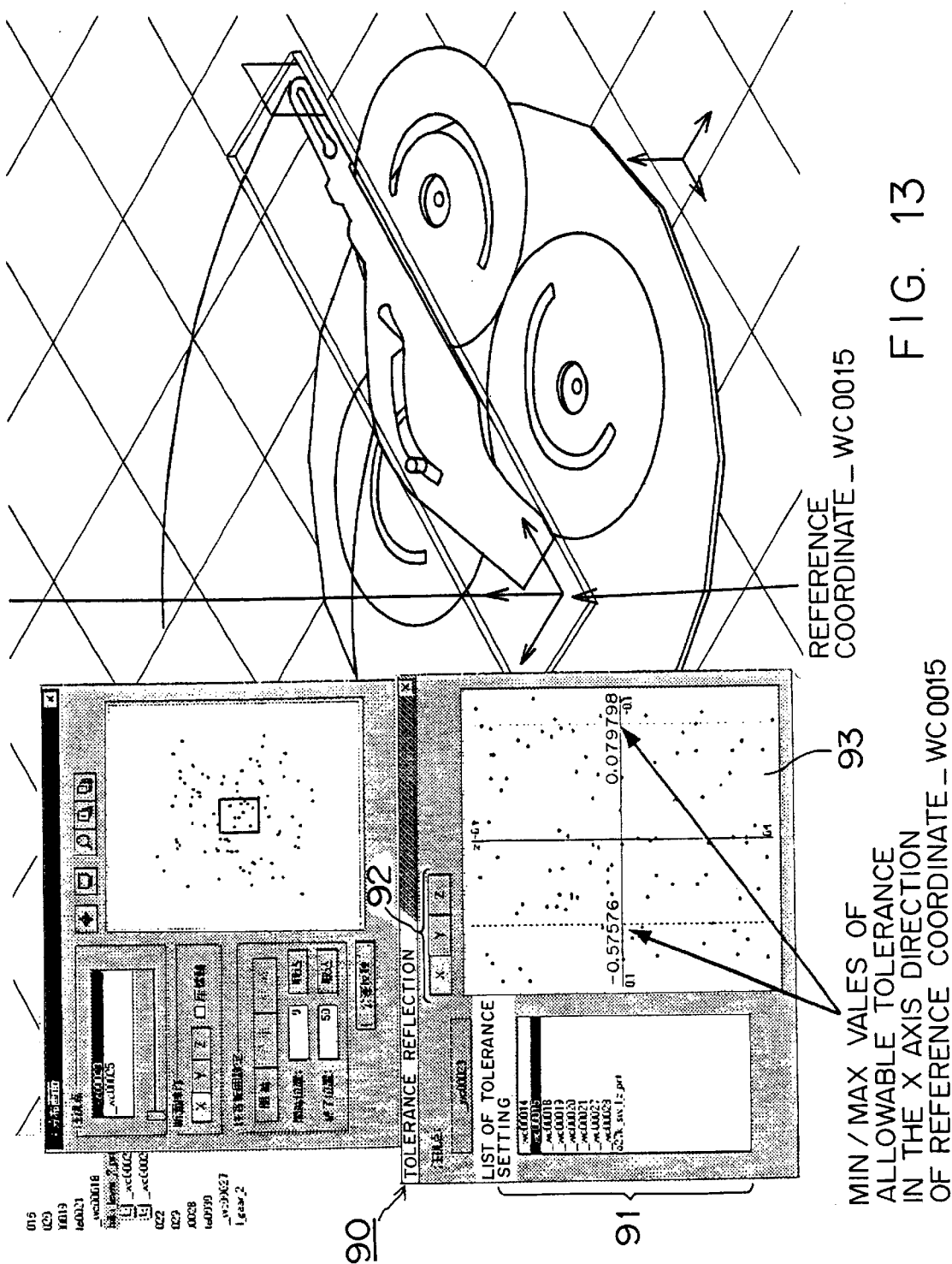
FIG. 13 shows an example of a tolerance reflection window.

If a "Tolerance reflection" button 84 is clicked, the tolerance reflection window 90 shown in FIG. 13 is displayed.

In this window, data for the position/orientation of each part (gear, etc.) (which is scattered at random within a tolerance range described above) are stored as the data of each individual (element) of an assembly population (each point on the right of FIG. 12). By referring to the data, the position/orientation of each part (gear, etc.) (deviation from a reference in the X/Y/Z axis direction and θ) (see FIG. 4B) of each individual (element) of an assembly population that exists within the designation range 87 can be obtained.

Therefore, if a user or the like selects an arbitrary part (in the example shown in FIG. 13, the reference coordinate system name of each part is displayed and _wc00015 is selected) from the list of tolerance settings 91 in the tolerance reflection window 90, and further selects an arbitrary axis direction from an axis direction selection button group 92 (in the example shown in FIG. 13, the X axis direction), each point is displayed in a display area 93, as shown in FIG. 13. In the example, this point represents the position (deviation from the reference) in the X axis direction of part _wc00015 of each individual (element) of an assembly population. In reality, the point of each individual (element) of an assembly population that exists within the designation range 87 is displayed with a different color, which is not shown in FIG. 13.

Since a user can easily visually confirm a range in which a point with a different color exists, the user can easily reset assembly with reference to this display.

Alternatively, as shown in FIG. 13, on the system side, the minimum/maximum values in the X axis direction of the point with a different color can be detected/displayed, and new tolerance can be designated using these values. This is possible by identifying each assembly sample that meets the design specification value imposed on a focus point in a memory.

In the example shown in FIG. 13, it is displayed that tolerance [−0.1, 0.1] initially designated should be reset to [−0.057576, 0.079798]. This means that in order to keep the operation of a focus point within the designated range 87, the assembly tolerance in the X axis direction of part _wc00015 must be narrowed to [−0.57576, 0.079798].

Similarly, the respective tolerance in the Y/Z axis directions is reset. Similarly, the respective tolerance of another part is reset.

As described above, by adopting a system according to this preferred embodiment, the optimal value of each tolerance parameter for keeping the operation of a focus point within the designated range 87 can be obtained.

However, the allowable tolerance range calculated in this way is a necessary condition for meeting design specification, but it is not a sufficient condition. In order to confirm that it can be a sufficient condition, it must be confirmed that all the points meet the design specification by resetting the range using the tolerance value reset above on the screen shown in FIG. 4B, regenerating the assembly population and repeating the analysis described above.

FIG. 14 is a flowchart showing the process procedures described above. FIG. 14 also shows the first allowable tolerance range backward analysis method according to this preferred embodiment.

In FIG. 14, first, as described with reference to FIG. 4B, the assembly tolerance of each part is set (step S41).

Then, an individual group of probability distribution is generated by changing the mounting position/orientation of each part at random within the range of assembly tolerance set in step S41. Specifically, a Monte-Carlo assembly population is generated (step S42).

Then, coordinate conversion for reproducing the actual mounting position/orientation is applied to each assembly individual (element) generated in step S42. Thus, as already described above, N assembly individual groups, each with a slightly different mounting state, are generated (step S43).

If there is a groove/play mechanism, the relationship is calculated for each individual (element) by the process shown in FIG. 9.

Then, as described with reference to FIG. 11, drive within the designated range is performed by a three-dimensional CAD simulation function and the like for each of the N assembly individuals (elements) with a slightly different mounting state, and the locus distribution of focus points (N loci) is generated (step S44). Then, a cross-section obtained by cutting this locus distribution in an arbitrary position is displayed according to the instruction of a user or the like. Specifically, the locus distribution is displayed as two-dimensional points (step S45). Then, the user or the like sets the designation range of design specification 87 described with reference to FIG. 12 (step S46). If this designation range 87 is predetermined in design specification, the range set/registered in advance can also be read and designated as the designation range 87. In this case, there is no need for a user to make the designation every time.

The system selects assembly individuals that exist within the designation range of a design specification set 87 by the user in a memory (step S47) and displays the selected assembly individuals in the assembly tolerance distribution in a different color from other samples (assembly individuals), as described about the tolerance reflection window 90 with reference to FIG. 13 (step S48).

In this case, for example, an identification code is assigned to each assembly individual (element) when the individual (element) is generated, and the mounting state (deviations in the X/Y/Z axis directions and θ) of each part in which the assembly individual (element) is generated is stored/managed in the memory in relation to the identification code. The data of each locus (a point in the cross-section) includes the identification code of an assembly individual that generates the locus. Since the identification code of each assembly individual that corresponding to each locus exists within the designation range of design specification 87 is obtained in this way, data that match the identification code can be retrieved/extracted in the memory. Therefore, as described above with reference to FIG. 13, the assembly individuals (elements) that corresponding to loci exist within the designation range of design specification 87 can be distinguished and displayed (for example, in a different color) in the scattered distribution of all the assembly individuals (elements) in the part/axis direction that is designated by the user.

Since the judgment process in step S49 is performed simply to confirm that sufficiency conditions are met or not met after the process is performed the second and subsequent time, the process is not described here. Then, the process in step S51 is performed in order to display a minimum/maximum value described with reference to FIG. 13, and the minimum/maximum value displayed for each part/axis direction is designated as a new assembly tolerance (step S52). Then, the flow returns to step S41 and the processes described above are repeated (as the second and subsequent processes) The second and subsequent process are the same as the first process except that their assembly tolerance values are different.

Thus, since, for example, in the example shown in FIG. 13, all the assembly individuals should be displayed within the range of [−0.057576, 0.079798] and simultaneously, if sufficiency conditions are met, all the assembly individuals (corresponding all loci) should exist within the designation range of design specification 87 in step S48 of the second and subsequent processes, all the assembly individuals should be displayed in the same color. Therefore, if all the samples are displayed in the same color (Yes in step S49), it can be confirmed that the new assembly tolerance meets the sufficiency conditions. Then, the process is terminated (step S50).

If all the samples are not displayed in the same color (No in step S49), specifically, if some assembly individuals (corresponding loci) are displayed outside of the designation range of design specification 87, as in the first time process, a minimum/maximum value is displayed, new assembly tolerance is set and the flow proceeds to the third process.

As described above, by adopting a system according to this preferred embodiment, a user can easily determine how the assembly tolerance of each part should be set in such a way that the operation of a focus point can meet the design specification.

Next, the second allowable tolerance range backward analysis method is described below.

Since in the first allowable tolerance range backward analysis method, the second and subsequent process are performed again from the beginning (specifically, from the point where the Min/Max value is reset as a new assembly tolerance and an assembly individual group is generated by the Monte-Carlo method), a long period of time is required by the process, and the work efficiency cannot be said to be high, especially if the analysis is repeated several times.

However, in the second allowable tolerance range backward analysis method, the resetting result of assembly tolerance can immediately be reflected in a GUI, which is described below. Specifically, if the assembly tolerance of each part is modified, it is promptly judged and displayed whether an assembly individual that meets the assembly tolerance after modification meets the design specification without generating an assembly individual (element) group by the Mont-Carlo method.

Figure 15:
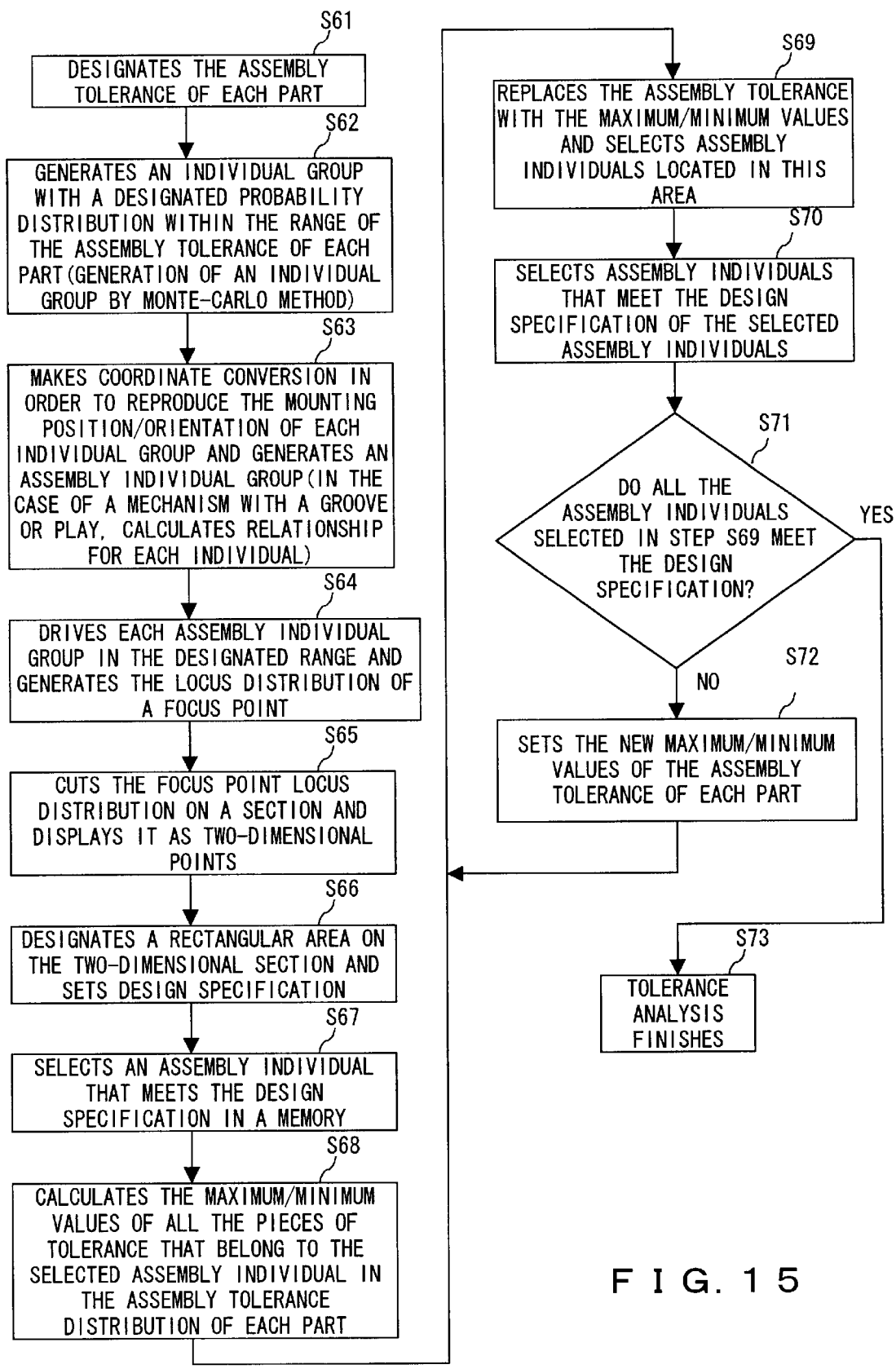
FIG. 15 is a flowchart showing the process of the second allowable tolerance backward analysis method.

FIG. 15 is a flowchart showing the process procedure of the second allowable tolerance range backward analysis method.

Since the processes in steps S61 through S67 shown in FIG. 15 are the same as those shown in steps S41 through 47, their descriptions are omitted. In step S68, a minimum/maximum value is calculated for each part/axis direction based on the data of each assembly individual (element) that meets the design specification (deviation value in each axis direction of each part obtained when the assembly individual is generated), in almost the same way as in step S51 shown in FIG. 14.

Then, the assembly tolerance for each part/axis direction is replaced with the calculated Min/Max value. Then, of the all the assembly individuals, an assembly individual, all the data of which are within the new assembly tolerance is extracted (selected) referring to the data (deviation value in each axis direction of each part)(step S69).

Then, of the assembly individuals extracted in step S69, assembly individuals that corresponding to loci ("point") exist within the design specification designation range 87 are selected (step S70).

If the calculated minimum/maximum value meets the sufficiency conditions described with reference to FIG. 14, all the assembly individuals (corresponding loci) extracted in step S69 should meet the designation range of design specification 87. Therefore, in step S71, it is judged whether all the assembly individuals meet the designation range of the design specification 87. If all the assembly individuals (corresponding loci) meet the designation range of the design specification 87 (Yes in step S71), the tolerance analysis process is terminated (step S73).

If some of all the assembly individuals extracted in step S69 (corresponding loci ("point")) do not meet the designation range of the design specification 87 (No in step S71), new assembly tolerance for each part/axis direction is set and the processes in steps S69 through S71 are repeated.

Figure 16A:
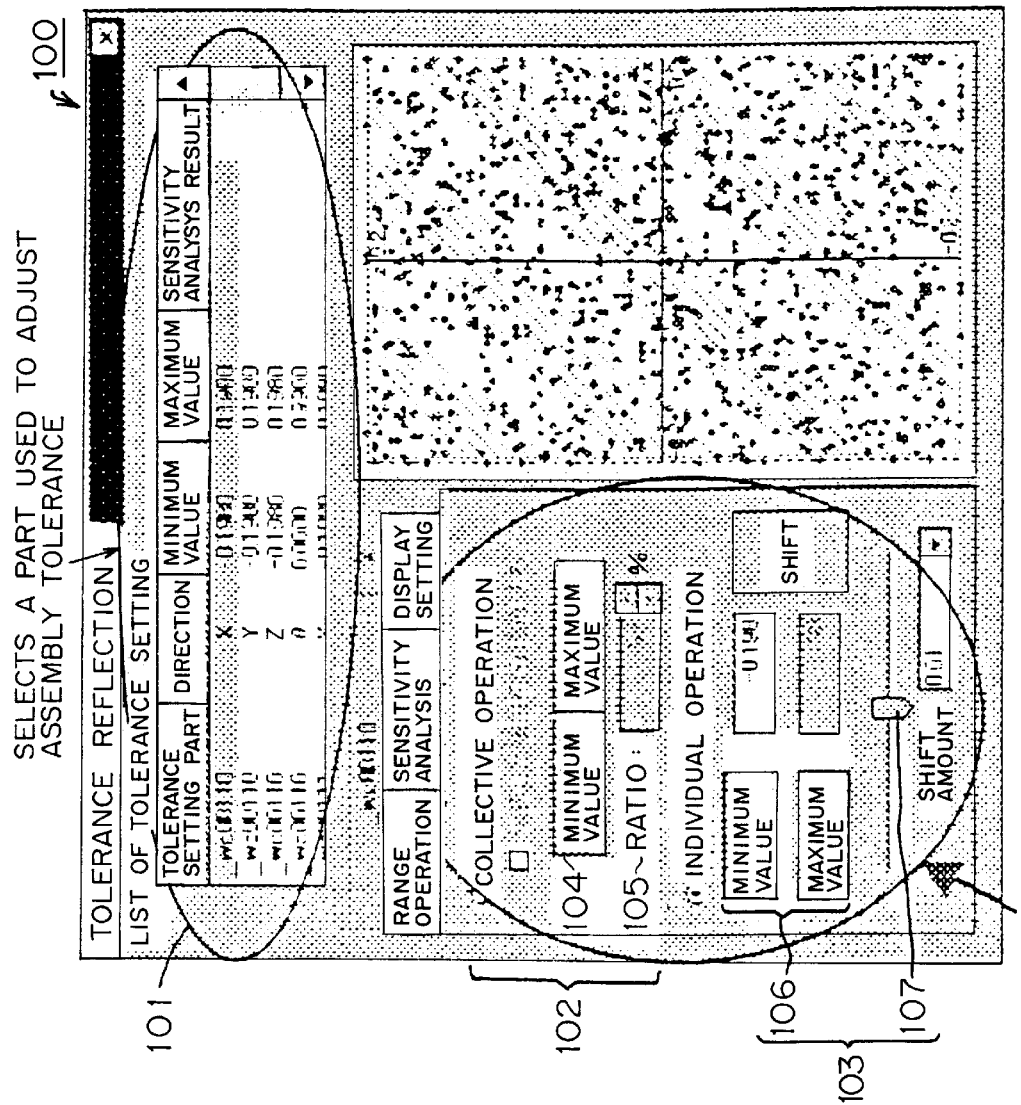
FIGS. 16A and 16B show examples of an assembly tolerance adjustment screen and a distribution screen, respectively.
Figure 16B:
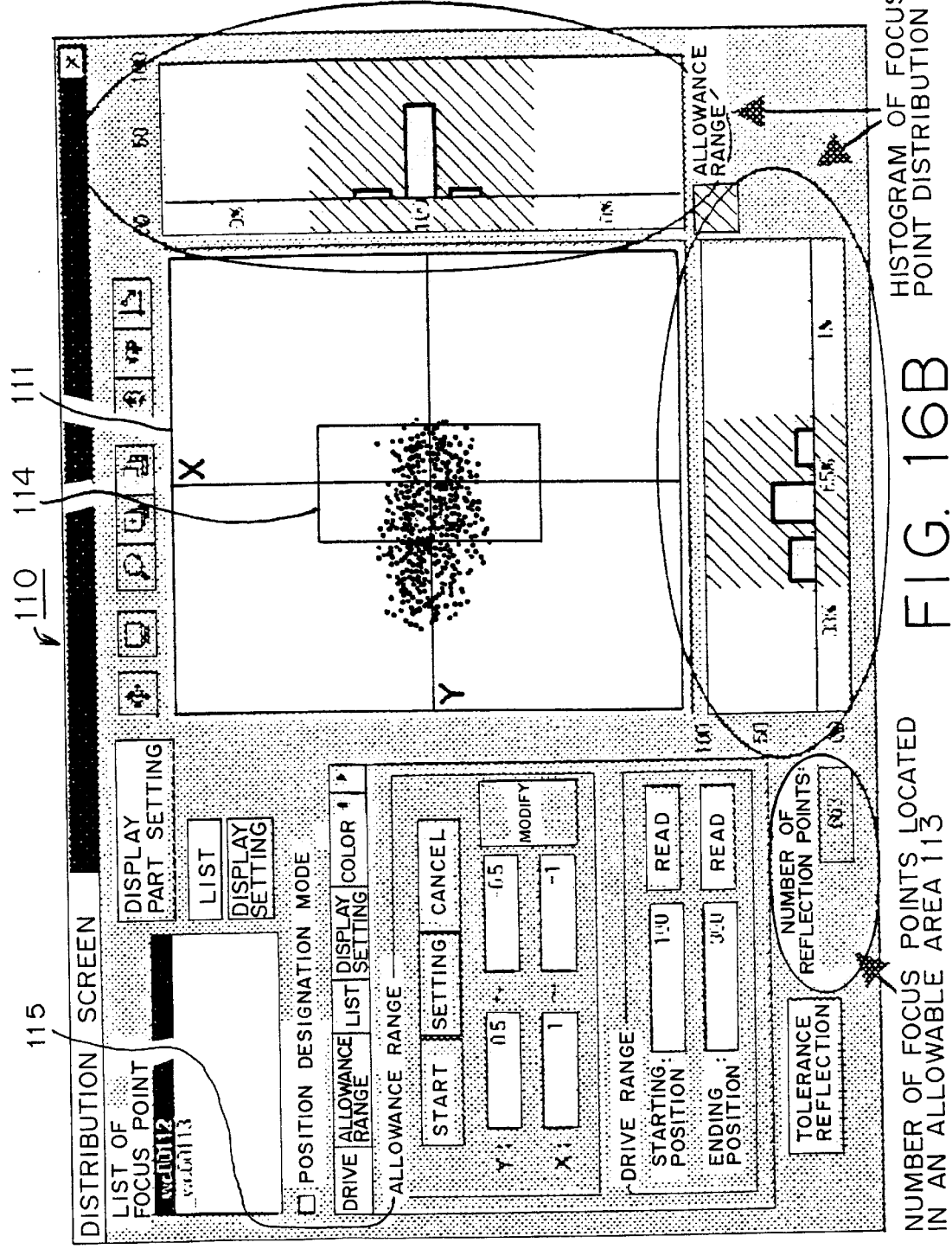
Figure 18:
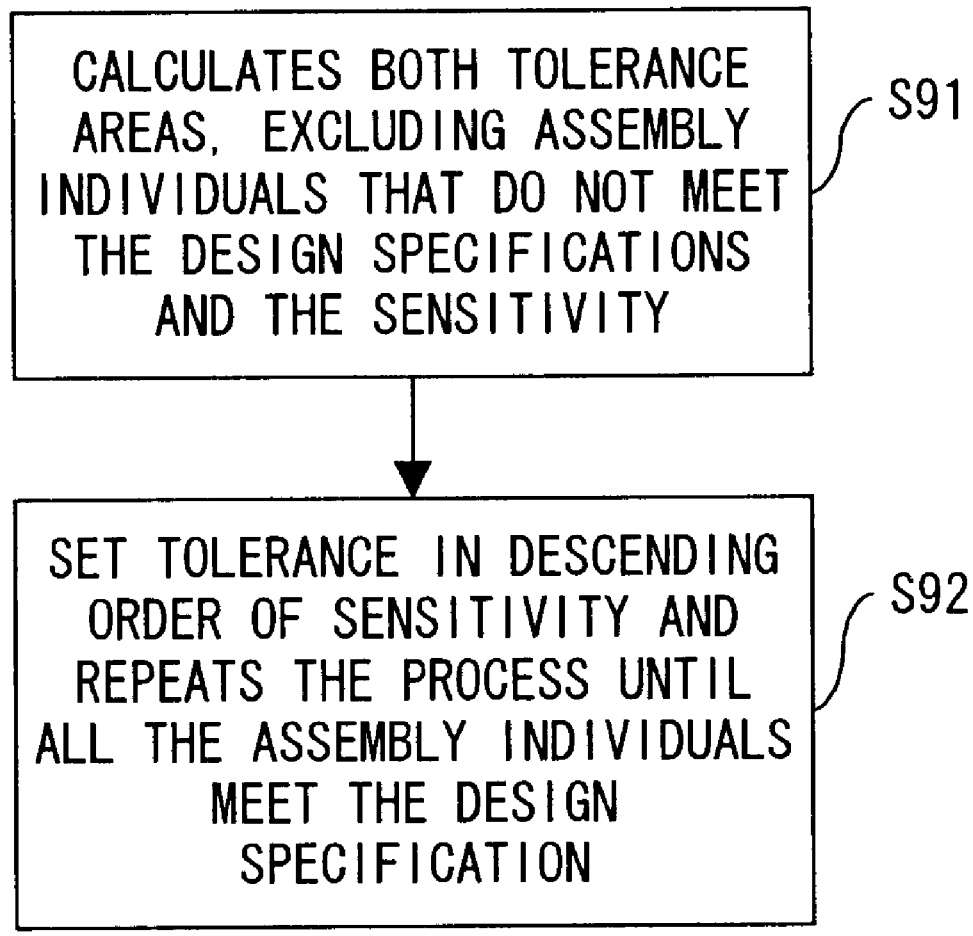
FIG. 18 is a flowchart showing the process of a sensitivity analysis tolerance reflection unit.

Although the setting of the new assembly tolerance is basically judged and determined by user trial and error based on the minimum/maximum value, in this preferred system, this user judgment work is simplified and supported by providing the GUI shown in FIGS. 16A and 16B.

In the modification setting work of new assembly tolerance, both the assembly tolerance adjustment screen 100 and distribution screen 110 shown in FIGS. 16A and 16B are displayed. The setting result on the assembly tolerance adjustment screen 100 is designed to be immediately reflected on the distribution screen 110.

On the assembly tolerance adjustment screen 100, assembly tolerance for each part/axis direction (in FIG. 16A, both the minimum/maximum values are displayed) can be adjusted and the assembly tolerance of all parts can be uniformly adjusted. Specifically, on receipt of the process result in step S68, first, the assembly tolerance adjustment screen 100 displays the "Min"/"Max" values for each part/axis direction as a list of tolerance settings 101. If in step S72, a user sets a new assembly tolerance, first, the user selects a collective operation 102 or an individual operation 103 on the assembly tolerance adjustment screen 100.

If the user selects the collective operation 102, the user selects the modification of either of the minimum/maximum values 104 and inputs a ratio 105. For example, if the user selects the maximum value and sets the ratio 105 of 90%, a value obtained by collectively multiplying the assembly tolerance values for each part/axis direction displayed in the list of tolerance settings 101 by 0.9 is set as a new assembly tolerance.

If the user selects the individual operation 103, the user designates a setting target in the list of tolerance settings 101 (in the example shown in FIG. 16A, the X axis direction of _wc00110), the user selects the modification of either of the minimum/maximum values 106 and sets a new value (in this case the user can directly input a figure or set the value by moving a slider 107 to the right or left using a mouse).

When the assembly tolerance is modified on the assembly tolerance adjustment screen 100, the distribution of "points" (loci) at focus points changes, and the change is promptly reflected on a cross-section 111 on the distribution screen 110. In this case, the distribution of "points" (loci) at some focus point (say "focus point distribution" described below) before assembly tolerance modification is displayed as it is and simultaneously the focus point distribution after the modification is displayed in a different color, which cannot be shown in FIG. 16A (for example, in the distributions before and after modification, focus points are displayed as green and pink points, respectively). Thus, the change of the focus point distribution from before and to after modification can be easily recognized. Furthermore, by displaying a projection distribution (histogram) 112 in the vertical and horizontal axes as shown in FIG. 16B, both the deviation from the center of the distribution and the distribution outside of an allowable tolerance range in the focus point distribution before/after modification can be easily recognized. By displaying the number of points located within the allowable tolerance range in the number of reflection points 113 or by displaying the number of focus points located outside of the allowable tolerance range, which is not shown in FIG. 16B, the effect of narrowing the tolerance can be easily recognized.

On the distribution screen 110, a designation range of a design specification 114 that is displayed based on both an allowable tolerance range setting area 115 and the setting content of this area is provided like the designation range of a design specification 87 displayed based on both the allowable tolerance range setting area 83 and the setting content in the area 83 in the distribution window 80.

Although in FIGS. 16A and 16B, basically a user sets a tolerance range on the assembly tolerance adjustment screen 110 by trial and error, the work efficiency can be improved by displaying the setting result of this trial and error in a promptly recognizable display form. However, if an index indicating that tolerance narrowing is most effective for a specific part, is provided, the trial and error work can be greatly reduced. In this case, the relationship between the assembly tolerance of each part and the distribution state of focus points are checked and the part/axis direction that is the most effective in locating the focus points within the allowable tolerance range is extracted.

Specifically, the assembly tolerance adjustment screen 110 shown in FIG. 16B selects the display screen of the item "Range operation" from the items, "Range operation", "Sensitivity analysis" and "Display setting". However, if, for example, the item "Sensitivity analysis" is selected, which is not shown in FIG. 16B, a screen for setting the assembly tolerance change amount (specific amount) of each part is displayed, the process shown in FIG. 17 is performed by the sensitivity analysis unit 16 based on this setting content and the processing result is displayed in a column "Sensitivity analysis result" on the right of the list of tolerance settings 101. In this case, a "specific amount" is, for example, 0.01 mm or 10% of set tolerance.

FIG. 17 is a flowchart showing this sensitivity analysis process.

If the change amount (specific amount) of assembly tolerance is set as described above, one of each part/axis direction is selected and every time it is selected, the focus point distribution to be obtained when the assembly tolerance of the selected part/axis direction is modified by a specific amount is calculated. The focus point distribution before modification is also stored. Then, the focus point distributions before and after modification are compared, the "change amount α in the number of assembly individuals that do not meet design specification" and "change amount β in the number of assembly individuals that meet design specification" are calculated and the sensitivity A is calculated as follows (step S81).

$$\text{Sensitivity } A = \alpha/\beta$$

This sensitivity A is displayed in a column, "Sensitivity analysis result" shown on the right of the list of tolerance settings 101 (step S82).

Then, the assembly tolerance of the part/axis direction used to calculated the sensitivity A is restored to the value that existed before modification. Then, the subsequent part/axis direction is selected and, similarly, the sensitivity A is calculated/displayed. If in this way, the respective sensitivity A of all the parts/axis directions are calculated/displayed, the process is terminated.

In this case, although the reduction of the number of "points" (loci) located out of the allowable tolerance range is a great target in adjusting tolerance and narrowing the range, simultaneously, as many "points" located within the allowable tolerance range as possible must be retained. As is clearly seen from the calculation expression of sensitivity A, the smaller the number of "points" located outside of the allowable tolerance range and the greater the number of "points" located within the allowable tolerance range, the greater the value of sensitivity A.

In other words, a part/axis direction with the highest sensitivity A is a part/axis direction, the influence of which is the greatest in locating "point" distribution within the allowable tolerance range.

Therefore, if the user modifies the assembly tolerance of a part/axis direction with the highest sensitivity A with priority, work efficiency can be improved.

According to the sensitivity analysis method described above, although the assembly tolerance of the part that should be adjusted can be judged, how much the tolerance should be adjusted cannot be judged. Thus, an almost optimal adjustment amount is automatically calculated and is presented to a user. It is acceptable if the user makes the fine adjustment of the amount. The sensitivity analysis tolerance reflection unit 17 implements this function.

FIG. 15 shows a basic flowchart showing the process of this sensitivity analysis tolerance reflection unit 17. First, the sensitivity analysis tolerance reflection unit 17 calculates an optimal tolerance range for eliminating assembly individuals that do not meet the design specification ("points" located outside of the allowable tolerance range 114). Specifically, the assembly tolerance of each part is modified and the tolerance is narrowed until the assembly individuals that do not meet the design specification ("points" located out of the allowable tolerance range 114) are eliminated. ("eliminate" means to move a point within the allowable tolerance range from outside of the allowable tolerance range, that is, "To narrow" means to narrow the width of assembly tolerance.) In this case, the following value is used for a sensitivity degree. (This is distinguished from sensitivity A and is called a sensitivity degree W).

$$\text{Sensitivity degree } W = \text{Sensitivity } A/\text{modification ratio}$$

(modification ratio=Width of assembly tolerance to be narrowed (adjustment amount)/Width of assembly tolerance (difference between the maximum and minimum values inputted on the assembly tolerance adjustment screen 100).)

The sensitivity degree W is calculated while sequentially targeting each assembly individual that does not meet the design specification (each point located outside of the allowable tolerance range 114) and setting a new assembly tolerance (adjustment amount) in such a way that at least such an assembly individual can be eliminated from each part/each axis direction (step S91). Both each sensitivity degree W and assembly tolerance at that moment (adjustment amount) are also stored.

If in this way, assembly tolerance is modified using all the pieces of the stored assembly tolerance (adjustment amounts), no point is located outside of the allowable tolerance range. However, since there is redundancy, the plurality of stored assembly tolerance (adjustment amounts) are sequentially modified in descending order of the stored sensitivity degrees using the corresponding assembly tolerance (adjustment amount) and this process is repeated until all the points are located in the allowable tolerance range.

Specifically, the highest of the calculated sensitivity degrees W is selected, and it is judged whether all the assembly individuals meet the design specification when the corresponding assembly tolerance (adjustment amount) is used. If the specification is not met, the judgment is made after also adding assembly tolerance (adjustment amount) corresponding to the second highest sensitivity degree. This process is repeated until all the assembly individuals meet the design specification (step S92).

Figure 19:
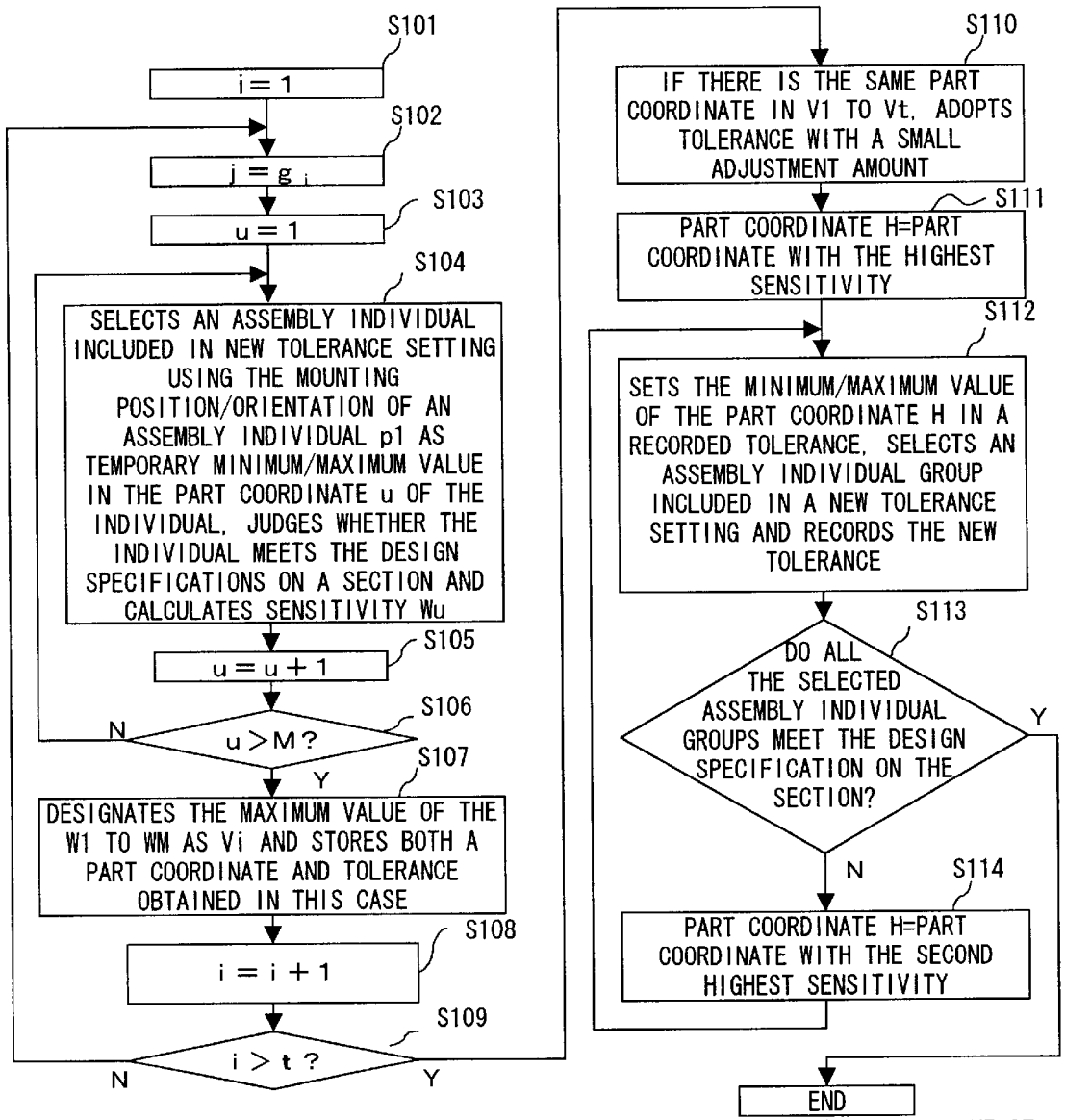
FIG. 19 is a detailed flowchart showing the process shown in FIG. 18.

FIG. 19 shows a detailed flowchart showing the process.

Before the description of the process is given, the premises will be described in detail.

First, it is assumed that there are M parts. The respective initial assembly tolerances of these M parts are represented by $C_1, C_2, \ldots, C_M$. N (for example, in the example described above, 10000) assembly individuals generated by the Monte-Carlo method in step S62 shown in FIG. 25 are represented by $A_1, A_2, \ldots, A_N$. The plurality of new assembly tolerances replaced with a maximum/minimum value in step S69 shown in FIG. 15 are represented by $C'_1, C'_2, \ldots, C'_M$. The numbers of the assembly individuals selected in step S69, that is, the assembly individuals (the number of which is L) that meet the plurality of new assembly tolerances $C'_1, C'_2, \ldots, C'_M$ are represented by $p_1, p_2, \ldots, p_L$. For example, if the assembly individuals selected in step S69 are $A_7, A_{29}$ and $A_{69}$ (L=3), $p_1=7, P_2=29$ and $P_3=69$. Then, the number of assembly individuals that are not selected in step S70 from $p_1, p_2, \ldots, p_L$, that is, the number of assembly individuals that do not meet the design specification (the number of which is t) are represented by $g_1, g_2, \ldots, g_t$ (g is one figure between 1 and L). For example, if $p_3, p_6$ and $p_8$ of $p_1, p_2, \ldots, p_L$ are the assembly individuals that are not selected, $g_1=3, g_2=6$ and $g_3=8$.

From the fact described above, it is known that those in steps S101 through S109 of all the processes shown in FIG. 19 are sequentially and repeatedly applied to each of the assembly individuals that are not selected in step S70, that is, the assembly individuals that meet new assembly tolerance but do not meet the design specification.

However, since in a memory, the assembly individuals that do not meet the design specification are managed using $g_1, g_2, \ldots, g_t$, the corresponding assembly individual numbers must be calculated. Therefore, in step S102, an assembly individual $P_j$ to be processed in step S104 is designated assuming $j=g_i$. For example, if the example described above is used, since in step S101, an initial value of 1 is assigned to i, $g_1=3$. Therefore, instep S102, j=3, and an assembly individual with number $p_3$ (in the example described above, $A_{69}$) is processed in step S104.

In step S104, first, the mounting position/orientation data of each part of the assembly individual to be processed obtained when the assembly individual is generated are read (which are stored in the memory after it is generated) and temporary assembly tolerance is set for each part u (part coordinates u) using the mounting position/orientation data. Specifically, as for part u, for example, it is assumed that parts u in the case u=1, u=2, u=3 and u=4 are gear A, gear B, gear C and part D, respectively. (Therefore, in this case, M=4.) The processes in steps S104 through S106 are repeatedly applied to each part of the parts in the case u=1 to 4 until u=5. In the example described above, if it is assumed that a process target is assembly individual $p_3$ if i=1, the minimum and maximum values of the assembly tolerance in the X axis direction of gear A are −0.1 and +0.1, and the mounting position/orientation of gear A of assembly individual $p_3$ is +0.6, the minimum and maximum values of the temporary assembly tolerance of assembly individual $p_3$ to be processed this time are −1.0 and +0.6, respectively. In this example, since the "width of the assembly tolerance to be narrowed" (adjustment amount) and the "width of assembly tolerance" become 0.4 and 2.0, respectively, the "modification ratio" (="width of assembly tolerance to be narrowed" (adjustment amount)/"width of assembly tolerance") becomes 0.2. The similar process is also applied to each of the Y axis direction, the Z axis direction and θ. Thus, as in step S81, assembly individuals that meet the assembly tolerance of all the parts (in this case, the assembly tolerance of gear A is modified to the temporary one and the respective assembly tolerance of the other parts remain the same) are selected from all the assembly individuals, and the sensitivity A is calculated by calculating both the "change amount in the number of assembly individuals that meet design specification" and the "change amount in the number of assembly individuals that do not meet the design specification" of all the selected assembly individuals.

Thus, the sensitivity degree W (=sensitivity A/modification ratio) can be calculated. In this case, if the sensitivity degree W of a part u is expressed as $W_u$, first, $W_1$ is calculated since the part u in case u=1 is processed first.

That is the process in step S104. The sensitivity $W_u$ in each of the parts in the case u=1 to M is calculated. In the example described above, sensitivity degrees $W_1$, $W_2$, $W_3$ and $W_4$ are calculated.

Then, in step S107, the largest value of the calculated sensitivity degrees $W_1$ to $W_M$ is designated as $V_i$. Then, i is incremented by +1 (step S108) and the process described above is repeatedly applied to all of $g_l$ to $g_r$ until $V_1$ to $V_t$ are obtained (step S109).

In this case, since in the case i=1, in step S104, the part mounting position/orientation obtained when assembly individual $p_3$ is generated is used as temporary assembly tolerance, at least assembly individual $p_3$ is modified to meet the design specification. Therefore, if the respective temporary assembly tolerance (adjustment amounts) of all of $g_l$ to $g_r$ are determined and a set of new assembly tolerance is set on the basis of all the adjustment amounts, all assembly individuals ($g_1$–$g_r$) that do not meet the design specification are modified to meet the design specification. Thus, as described above, if a plurality of assembly tolerances are modified using all pieces of the stored assembly tolerance (adjustment amounts), no point is located outside of the allowable tolerance range. However, although no point is located outside of an allowable tolerance range, there is redundancy. In other words, there is a possibility that assembly tolerance may be overly narrowed.

Therefore, instead of suddenly modifying the assembly tolerance using all the pieces of temporary assembly tolerance (adjustment amounts), it is judged whether no point is located outside of the allowable tolerance range every time assembly tolerance is sequentially modified using one piece of temporary assembly tolerance, the process is terminated when no point is located outside of an allowable tolerance range and assembly tolerance modified up to that time become the almost optimally adjusted assembly tolerance described above. In this case, it is preferable to sequentially modify assembly tolerance using one piece of assembly tolerance (adjustment amount) at one time in descending order of sensitivity degrees W. Those are the processes in steps S111 through S114 shown in FIG. 19.

However, in this example, if in step S110, among $V_1$ through $V_t$, the part coordinates stored in step S107 of which are the same (for example, since the respective sensitivity degrees of $V_1$ and $V_2$ both are $W_1$ of $W_1$ to $W_M$ in step S107, part coordinates in case u=1 at this moment are stored for both $V_1$ and $V_2$), the smallest adjustment amount is adopted.

First, among $V_1$ through $V_t$, the largest one (the sensitivity of which is the highest; however, except not adopted one in step S110) are selected (step S111), the assembly tolerance is modified using corresponding temporary assembly tolerance (which are related and stored in step S107), assembly individuals that meet the new assembly tolerance are selected from all the assembly individuals and it is judged whether all the selected assembly individuals meet the design specification (step S113). If at least one assembly individuals do not meet the design specification (No in step S113), the second highest sensitivity (the second highest one among $V_1$ through $V_t$ is selected (step S114) and the assembly tolerance is modified using corresponding temporary assembly tolerance in the same way as described above. However, in this case, the assembly tolerance modified by the highest sensitivity is stored as it is and another piece of assembly tolerance is further generated/stored. Then, the judgment in step S113 is made. If the judgment is No, the third highest sensitivity, then the fourth highest sensitivity and the like are sequentially selected and a plurality of new assembly tolerance are generated.

If all the assembly individuals meet the design specification (Yes in step S113), the process is terminated and the assembly tolerance at that moment (assembly tolerance after modification) or adjustment amount used for the modification is presented to a user. Thus, since it is acceptable if the user simply makes fine adjustment referring to the assembly tolerance that is almost optimally adjusted or the adjustment amount, there is no need to determine an optimal assembly tolerance by trial and error. Therefore, the work efficiency in determining an optimal assembly tolerance can be greatly improved.

The assembly tolerance analysis system/method according to the present invention described above can be implemented by downloading the program shown by the flowcharts in FIGS. 8, 14, 15, 17, 18, 19 and the like from a memory storing the program or the outside to a computer.

FIG. 20 shows the loading onto the computer of such a program for implementing the present invention.

In FIG. 20, an information processing device (computer) 121 for implementing the assembly tolerance analysis system/method of the present invention comprises a main body 122, a memory 123 and the like. For the memory 123, a storage device, such as a random-access memory (RAM), a hard disk, a magnetic disk and the like is used. The memory 123 corresponds, for example, to the RAM 23/storage device 22 shown in FIG. 2.

The memory 123 stores the program shown by the flowcharts in FIGS. 8, 14, 15, 17, 18, 19 and the like. By the main body 122 (CPU 21, etc.) executing this program, a variety of processing functions of the assembly tolerance analysis system/method of the present invention described above can be implemented.

The program can also be downloaded onto the information processing device 121 from another information processing device (server, etc.) on a program provider side through a network 124. Alternatively, the variety of processing functions of the assembly tolerance analysis system/method of the present invention described above can be implemented by setting a portable storage medium 125 that stores the program and is distributed, in the information processing device 121 and making the main body 122 execute the program.

For the portable storage medium 125, for example, a CD-ROM, a floppy disk, an optical disk, a magneto-optical disk or the like can be used.

As described above in detail, according to the assembly tolerance analysis apparatus of the present invention, the acquisition of the optical assembly tolerance of each part composing a three-dimensional mechanism assembly model organized in a computer can be supported using backward analysis based on the Monte-Carlo method. By improving the processing speed of this backward analysis and further providing a user-friendly GUI, the work efficiency of a user in calculating an optimal assembly tolerance can be further improved. By calculating and presenting how much the assembly tolerance of a specific part which contributes to narrowing the operation of focus points into a design specification range (called "sensitivity"), the work efficiency of a user can be further improved. Furthermore, since an almost optimal adjustment amount is automatically calculated and presented to a user, it is acceptable if the user makes a fine adjustment based on the amount and, accordingly, the work efficiency of a user can be further improved.

The present invention improves the yield of mass produced equipment and contributes to the reliability of mechanical design.

What is claimed is:

1. An assembly tolerance analysis apparatus, comprising:
   an object shape/assembly information storage unit storing shape/assembly information of each part composing an analysis target;
   a Monte-Carlo population generation unit generating a population of assembly samples with a slightly different mounting position/orientation of each part using Monte-Carlo method based on an initial setting value of an assembly tolerance of each part composing an analysis target;
   a simulation unit simulating an operation of the analysis target in the part mounting position/orientation for each assembly sample obtained by the Monte-Carlo population generation unit using the shape/assembly information and calculating an operation locus of an arbitrary focus point; and
   an allowable tolerance range backward analysis unit selecting a locus located within a design specification range imposed on the focus point from a plurality of operation loci and determining a new assembly tolerance based on the mounting position/orientation of each part of an assembly sample corresponding to the selected locus.

2. The assembly tolerance analysis apparatus according to claim 1, further comprising
   a hysteresis analysis unit faithfully reproducing a play mechanism of a groove in the simulation.

3. The assembly tolerance analysis apparatus according to claim 1, wherein
   said allowable tolerance range backward analysis unit generates the operation locus in an arbitrary position of the operation locus on a two-dimensional cross-section, setting a range of design specification on the two-dimensional cross-section and makes the selection.

4. The assembly tolerance analysis apparatus according to claim 1, which repeats processes of both said Monte-Carlo population generation method and simulation unit using a new assembly tolerance determined by said allowable tolerance range backward analysis unit and judges whether all the operation loci are located within the range of the design specification.

5. The assembly tolerance analysis apparatus according to claim 1, which selects assembly samples in which the mounting position/orientation of the part of the assembly sample meets the new assembly tolerance and judges whether all the operation loci of the selected assembly samples meet the range of design specification.

6. The assembly tolerance analysis apparatus according to claim 5, further comprising:
   a unit displaying projection distribution of the operation locus generated on the two-dimensional cross-section.

7. The assembly tolerance analysis apparatus according to claim 6, which displays
   an assembly tolerance input screen for inputting/modifying the assembly tolerance of each part composing the analysis target; and
   a distribution screen for displaying both the two-dimensional cross-section and the projection distribution of operation loci generated on the two-dimensional cross-section, wherein
      input/modification of assembly tolerance on the assembly tolerance input screen is immediately reflected in display of both the operation locus distribution and projection screen on the distribution screen.

8. The assembly tolerance analysis apparatus according to claim 5, further comprising:
   a sensitivity analysis unit calculating and displaying a sensitivity for indicating how much a modification of the assembly tolerance of each part contributes to eliminate operation loci located outside of the range of design specification if the operation locus is located outside of the design specification range and new assembly tolerance is further set.

9. The assembly tolerance analysis apparatus according to claim 8, wherein
   said sensitivity analysis unit designates a ratio between a change amount in the number of operation loci located within the range of the design specification and a change amount in the number of operation loci located outside of the range of the design specification that are obtained when assembly tolerance of each part is narrowed by a specific amount, as sensitivity.

10. The assembly tolerance analysis apparatus according to claim 5, further comprising
    a sensitivity analysis tolerance reflection unit calculating/presenting a modification amount of assembly tolerance of each part needed to eliminate the operation loci located outside of the range of design specification if an operation locus is located outside of the range of design specification and new assembly tolerance is further set.

11. The assembly tolerance analysis apparatus according to claim 10, wherein
    said sensitivity analysis tolerance reflection unit calculates for each operation locus located outside of the range of the design specification an adjustment amount of assembly tolerance such that at least the operation locus is located within the design specification range, calculates the sensitivity and calculates the modification amount by continuing to modify assembly tolerance using the adjustment amount in descending order of the sensitivity.

12. The assembly tolerance analysis apparatus according to claim 1, wherein rectangular distribution, normal distribution or beta distribution is used for probability distribution of a population generated by the Monte-Carlo method.

13. An assembly tolerance analysis method, comprising:

generating a population of assembly samples with a slightly different mounting position/orientation for each part using Monte-Carlo method based on an initial setting value of assembly tolerance of each part composing an analysis target;

simulating an operation of the analysis target in the part mounting position/orientation for each assembly sample using the shape/assembly information and calculating an operation locus of an arbitrary focus point; and selecting a locus that is located within a range of a design specification imposed on the focus point from a plurality of operation loci and determining new assembly tolerance based on the mounting position/orientation of each part of the assembly sample corresponding to the selected locus.

14. The assembly tolerance analysis method according to claim 13, further comprising:

selecting assembly samples in which the mounting position/orientation of the part of the assembly sample meets the new assembly tolerance and judging whether all the operation loci of the selected assembly samples meet the range of design specification.

15. The assembly tolerance analysis method according to claim 14, further comprising:

designating a ratio between a change amount in the number of operation loci located within the design specification and a change amount in the number of operation loci located outside of the design specification range that are obtained when the assembly tolerance of each part is narrowed by a specific amount, as sensitivity.

16. The assembly tolerance analysis method according to claim 14, further comprising:

calculating/presenting a modification amount of assembly tolerance of each part needed to eliminate the operation loci located outside of the range of the design specification if an operation locus is located outside of the range of design specification and subsequent new assembly tolerance is set.

17. A computer-readable storage medium which stores a program for enabling a computer to execute a process, said process comprising:

generating a population of assembly samples with a slightly different mounting position/orientation for each part using Monte-Carlo method based on an initial setting value of an assembly tolerance of each part composing an analysis target;

simulating an operation of the analysis target in the part mounting position/orientation for each assembly sample using the shape/assembly information and calculating an operation locus of an arbitrary focus point; and selecting a locus that is located within a range of a design specification imposed on the focus point from a plurality of operation loci and determining the new assembly tolerance based on the mounting position/orientation of each part of an assembly sample corresponding to the selected locus.

18. The computer-readable storage medium according to claim 17, said process further comprising:

presenting a ratio between a change amount in the number of operation loci located within the design specification and a change amount in the number of operation loci located outside of the range of the design specification that are obtained when the assembly tolerance of each part is narrowed by a specific amount, as sensitivity.

19. The computer-readable storage medium according to claim 17, said process further comprising:

calculating/presenting a modification amount of the assembly tolerance of each part needed to eliminate the operation loci located outside of the range of the design specification if an operation locus is located outside of the range of the design specification and a new assembly tolerance is subsequently set.

20. A transmission signal that stores a program for enabling a computer to execute a process, said process comprising:

generating a population of assembly samples with a slightly different mounting position/orientation for each part using Monte-Carlo method based on an initial setting value of an assembly tolerance of each part composing an analysis target;

simulating an operation of the analysis target in the part mounting position/orientation for each assembly sample using the shape/assembly information and calculating an operation locus of an arbitrary focus point; and selecting a locus located within a range of a design specification imposed on the focus point from a plurality of operation loci and determining a new assembly tolerance based on the mounting position/orientation of each part of the assembly sample corresponding to the selected locus.

* * * * *